(12) United States Patent
Alismail et al.

(10) Patent No.: US 12,450,915 B2
(45) Date of Patent: Oct. 21, 2025

(54) SYSTEMS AND METHODS FOR CALIBRATION AND VALIDATION OF RANGE SENSORS AND LIDAR SENSORS MOUNTED ON A VEHICLE THAT HAVE NON-OVERLAPPING FIELDS OF VIEW (FOV)

(71) Applicant: FORD GLOBAL TECHNOLOGIES, LLC, Dearborn, MI (US)

(72) Inventors: Hatem Alismail, Pittsburgh, PA (US); Michael Schoenberg, Seattle, WA (US)

(73) Assignee: Ford Global Technologies, LLC, Dearborn, MI (US)

( * ) Notice: Subject to any disclaimer, the term of this patent is extended or adjusted under 35 U.S.C. 154(b) by 437 days.

(21) Appl. No.: 18/049,988

(22) Filed: Oct. 26, 2022

(65) Prior Publication Data

US 2024/0144694 A1   May 2, 2024

(51) Int. Cl.
*G06V 20/58* (2022.01)
*B60W 60/00* (2020.01)
*G06T 7/292* (2017.01)
*G06V 30/19* (2022.01)

(52) U.S. Cl.
CPC ........... *G06V 20/58* (2022.01); *B60W 60/001* (2020.02); *B60W 2420/408* (2024.01); *B60W 2554/4041* (2020.02); *B60W 2554/4048* (2020.02); *G06T 7/292* (2017.01); *G06V 30/19093* (2022.01)

(58) Field of Classification Search
None
See application file for complete search history.

(56) References Cited

U.S. PATENT DOCUMENTS

| | | | |
|---|---|---|---|
| 10,436,885 B2 | 10/2019 | Wheeler et al. | |
| 10,802,122 B1* | 10/2020 | Goldberg | G01S 17/42 |
| 10,852,731 B1 | 12/2020 | Braley et al. | |
| 2020/0404197 A1* | 12/2020 | Gassend | H04N 25/531 |
| 2021/0056326 A1* | 2/2021 | Kumar | G05D 1/0214 |
| 2021/0142526 A1* | 5/2021 | Mantyjarvi | B60W 60/001 |

(Continued)

OTHER PUBLICATIONS

Anonymous, "Multi-Lidar Calibration", Mathworks, available at www.mathworks.com/help/lidar/ug/multi-lidar-calibration-workflow.html, printed Jan. 25, 2023 (16 pages).

(Continued)

*Primary Examiner* — Haris Sabah
(74) *Attorney, Agent, or Firm* — Frank A. Mackenzie; Brooks Kushman, P.C.

(57) ABSTRACT

Methods and systems calibrating LiDAR sensors mounted on a vehicle and having non-overlapping fields of view (FOVs). The methods include collecting first sensor data corresponding to a calibration environment from a first LiDAR sensor mounted on the vehicle, and second sensor data corresponding to the calibration environment from a second sensor LiDAR sensor mounted on the vehicle. The methods also include transforming the first sensor data to generate a first aligned frame in a global reference frame, and transforming the second sensor data to generate a second aligned frame in the global reference frame. The first reference frame is aligned with the second reference frame to extrinsically calibrate the first LiDAR sensor and the second LiDAR sensor.

19 Claims, 18 Drawing Sheets

(56) References Cited

U.S. PATENT DOCUMENTS

2021/0215809 A1* 7/2021 Goldberg ............... B60R 11/00

OTHER PUBLICATIONS

Bergelt et al., "Improving the Intrinsic Calibration of a Velodyne LiDAR Sensor", 2017 IEEE Sensors, 2017, pp. 1-3.
Bosse et al., "Continuous 3D scan-matching with a spinning 2D laser", 2009 IEEE International Conference on Robotics and Automation, 2009, pp. 4312-4319.
Chen et al., "Object modelling by registration of multiple range images", Proceedings of the 1991 IEEE International Conference on Robotics and Automation, Sacremento, CA, Apr. 1991, pp. 2724-2729 (also at: Image and Vision Computing (1992), 10(3): 145-155).
Chen et al., "On-site sensor recalibration of a spinning multi-beam LiDAR system using automatically-detected planar targets", Sensors 2012, 12(10): 13736-13752.
Choi et al., "Robust reconstruction of indoor scenes", 2015 IEEE Conference on Computer Vision and Pattern Recognition (CVPR), 2015, pp. 5556-5565.
Das et al., "Extrinsic Calibration and Verification of Multiple Non-overlapping Field of View Lidar Sensors", Manuscript 651 submitted to 2022 IEEE ICRA, available at www.robots.ox.ac.uk/~mobile/drs/Papers/2022ICRA_das.pdf (7 pages).
Fischler et al., "Random Sample Consensus: A Paradigm for Model Fitting with Applications to Image Analysis and Automated Cartography", Comm. of the ACM, 1981, 24(6): 381-395.
Huber, "Robust Statistics" Wiley publisher, 1981 (2 pages).
Jeong et al., "The road is enough! extrinsic calibration of non-overlapping stereo camera and lidar using road information", IEEE Robotics and Automation Letters, 2019, 4(3): 2831-2838.
Jiao et al., "Automatic Calibration of Multiple 3D LiDARs in Urban Environments", 2019, arXiv:1905.04912, 7 pages.
Kümmerle et al., "G2o: A general framework for graph optimization", 2011 IEEE International Conference on Robotics and Automation, 2011, pp. 3607-3613.
Levenberg, "A Method for the Solution of Certain Non-Linear Problems in Least Squares", Quarterly of Applied Mathematics, 1944, 2(2): 164-168.
Levinson et al., "Automatic Online Calibration of Cameras and Lasers", Robotics: Science and Systems, 2013, 8 pages.
Marquardt, "An Algorithm for Least-Squares Estimation of Non-linear Parameters", SIAM Journal on Applied Mathematics, 1963, 11(2): 431-441.
Mirzaei et al., "3D LIDAR-camera intrinsic and extrinsic calibration: Identifiability and analytical least-squares-based initialization", The International Journal of Robotics Research, 2012, 31(4): 452-467.
Nouira et al., "Point cloud refinement with self-calibration of a mobile multibeam lidar sensor", The Photogrammetric Record, 2017, 32(3), 25 pages.
Pentek et al., "A flexible targetless LiDAR-GNSS/INS-camera calibration method for UAV platforms", ISPRS Journal of Photogrammetry and Remote Sensing,, 2020, 166: 297-307.
Raposo et al., "Extrinsic calibration of multi-modal sensor arrangements with non-overlapping field-of-view", Machine Vision and Applications, 2017, 28: 141-155.
Wan et al., "Robust and Precise Vehicle Localization Based on Multi-Sensor Fusion in Diverse City Scenes", In 2018 IEEE International Conference on Robotics and Automation, ICRA 2018, Brisbane, Australia, May 21-25, 2018. pp. 4670-4677.
Xia et al., "Global calibration of non-overlapping cameras: State of the art", Optik, 2018, 158: 951-961.
Zhong, "Intrinsic shape signatures: A shape descriptor for 3D object recognition", 2009 IEEE 12th International Conference on Computer Vision Workshops, ICCV Workshops, 2009, pp. 689-696.
Information about Related Patents and Patent Applications, see the accompanying Information Disclosure Statement Letter, which concerns Related Patents and Patent Applications.

* cited by examiner

SYSTEMS AND METHODS FOR CALIBRATION AND VALIDATION OF RANGE SENSORS AND LIDAR SENSORS MOUNTED ON A VEHICLE THAT HAVE NON-OVERLAPPING FIELDS OF VIEW (FOV)

BACKGROUND

The present disclosure relates to autonomous vehicle sensor calibration and validation and, in particular, to calibration and calibration validation of range sensors (e.g., light detection and ranging (LiDAR) sensors) mounted on a vehicle that have non-overlapping fields of view (FOV).

Autonomous driving requires perception and prediction of the surrounding environment, including other actors on the road. This aids in decreasing the potential for conflict between an autonomous vehicle (AV) and other actors and objects along a trajectory of the AV. AVs utilize a variety of sensors for such perception and prediction of the surrounding environment.

For example, range sensors capture the three-dimensional (3D) structure of the world from the viewpoint of the sensor by measuring the depth to the nearest surfaces. Example range sensors include LiDAR sensors, radio detection and ranging (RADAR) sensors, sound navigation and ranging (SONAR) sensors. For example, a LiDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

Such range sensors need to be calibrated and synchronized with respect to each other for efficient and accurate usage. However, combining sensor data from multiple range sensors may be technically challenging. Moreover, the use of multiple non-overlapping FOV range sensors in autonomous vehicles has increased in order to eliminate blind spots in the vehicle's immediate vicinity, thereby allowing the vehicle to make more informed and confident decisions. While calibration methods exist for calibrating sensors having overlapping FOVs, such methods cannot be used for calibrating sensors with non-overlapping FOVs.

This document describes methods and systems that are directed to addressing the problems described above, and/or other issues.

SUMMARY

This document describes methods, systems, and computer program products for calibrating LiDAR sensors mounted on a vehicle and having non-overlapping fields of view (FOVs). The methods may include collecting first sensor data corresponding to a calibration environment from a first LiDAR sensor mounted on the vehicle, and second sensor data corresponding to the calibration environment from a second sensor LiDAR sensor mounted on the vehicle. The methods may also include transforming the first sensor data to generate a first aligned frame in a global reference frame, and transforming the second sensor data to generate a second aligned frame in the global reference frame. The first reference frame is aligned with the second reference frame to extrinsically calibrate the first LiDAR sensor and the second LiDAR sensor.

Implementing systems of the above-described methods for calibration and can include, but are not limited to, a processor and a non-transitory computer-readable storage medium comprising programming instructions that are configured to cause the processor to implement a method for calibrating sensors. Optionally, the programming instructions may be included in a computer program product.

DETAILED DESCRIPTION

Figure 1:
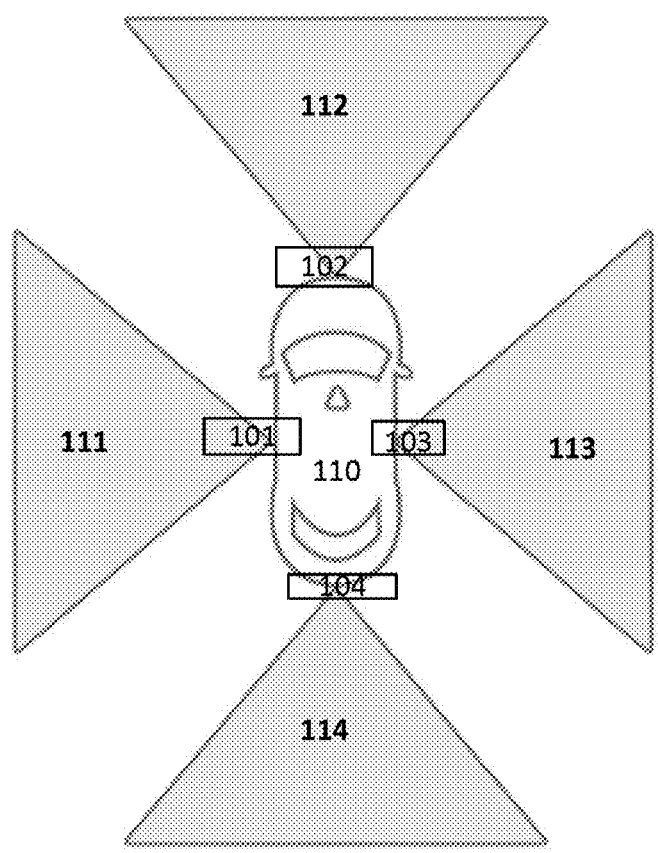
FIG. 1 illustrates an example vehicle including range sensors with non-overlapping FOVs.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," and the like each refer to a non-transitory device on which computer-readable data, programming instructions or both are stored. The terms "storage," "storage device," and "disk storage" specifically refer to a non-transitory device, such as a hard drive (HDD) or solid-state drive (SDD), that stores data persistently for a relatively longer period. The term "memory" may be used generally in this document to refer either to a storage device that stores information on a persistent basis, or to a device that stores information on a non-persistent basis such as a random access memory (RAM) device. Except where specifically stated otherwise, the terms "memory," "memory device," "storage," "disk storage," "storage device" and the like are intended to include single device embodiments, embodiments in which multiple devices together or collectively store a set of data or instructions, as well as individual sectors within such devices. A "storage location" is a segment, sector, or portion of a storage device. The relative terms "first storage location" and "second storage location" refer to different storage locations, which may be elements of a single device or elements of multiple devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to hardware, programming instructions embodied in software or firmware, or a combination of hardware and programming instructions that work together to perform a described function. Various hardware elements such as processors may be shared among multiple modules. Similarly, various programming instruction portions, such as subroutines or libraries, may be shared among multiple modules.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

"Extrinsic calibration" refers to determining the physical location of the sensors relative to one another. Extrinsic calibration is parameterized using a rotation and translation between sensor coordinate frames. "Intrinsic calibration" describes a method of setting or adjusting the internal parameters of a sensor.

In this document, when terms such as "first" and "second" are used to modify a noun, such use is simply intended to distinguish one item from another, and such terms are not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An AV may include one or more sensors of various and complementary types to capture information of the external environment of AV because successful navigation of an AV depends on having accurate data measurement and representation of the external environment at all times. Having accurate data or three-dimensional model of the external environment is, in turn, dependent at least in part on proper calibration of the AV's sensors, which may include knowing the initial configurations and/or conditions of the sensors and how objects or obstacles are detected by the sensors. In order to properly process data obtained by the sensors, a system may need to know the relationship between the sensor data and the position, orientation, and/or configuration of the sensors (for the same sensor as well as in association with other sensors), since any misalignment, rotation, or translation of the sensors, if not properly accounted for, may prevent the generation of an accurate model that accurately represents the external environment of the AV or the ability of the AV to accurately perceive the external environment.

For example, extrinsic calibration needs to be performed for all the LiDAR devices positioned on a vehicle to obtain point clouds representative of objects which have consistent intensity values, and ensure that the locations of the objects detected in the environment are collocated between LiDAR devices. Poorly calibrated LiDAR devices result in aliasing of environment objects (e.g., walls are smeared or duplicated) and a single object may have a large distribution of intensity values. Specifically, when a first sensor captures first data of an environment and a second sensor captures second data of the environment, and the first and second sensors are correctly calibrated (with respect to each other, with respect to the vehicle, and/or internally), the sensor data from the first and second sensors can be combined to produce an aligned representation (e.g., a "crisp" representation) of the environment. However, when the sensors are incorrectly calibrated, the combined sensor data may represent an inaccurate depiction (e.g., a "blurry" representation) of the environment. Such a blurring may result, for example, where the relative positions and/or orientations of the sensors are not accurate.

In other words, prior to using sensor data collected by the range sensors mounted on an AV, internal as well as external calibration of each sensor has to be performed. Although there are many existing methods that can handle the extrinsic and intrinsic calibration for range sensors (e.g., LiDARs), with a common FOV, an AV may include multiple sensors with non-overlapping FOVs. For example, FIG. 1 illustrates four LiDAR sensors 101, 102, 103, 104 mounted on a vehicle 110, that have non-overlapping FOVs 111, 112, 113, and 114. When the FOVs of the multiple LiDAR devices overlap, calculation of the calibration parameters of the multiple LiDAR devices is straightforward. For example, for calibrating overlapping FOV LiDARs, a vehicle on which the multiple LiDAR devices are mounted is stationed at a given location, light is emitted from the multiple LiDAR devices, LiDAR returns are recorded for each one of the LiDAR devices, and a match is performed between the multiple LiDAR returns to solve the calibration problem. Given that the FOVs of the multiple LiDAR devices overlap, the calibration parameters are determined based on the overlapping point clouds recorded by the multiple LiDAR devices. In contrast, when FOVs of the LiDAR devices do not overlap, the calibration mechanism described above cannot be performed as there are no overlapping point clouds.

As such, a multi-sensor calibration approach between such non-overlapping FOV range sensors is required to generate a combined representation (e.g., point cloud, etc.) of a scanned environment. Since the primary reason for using such non-overlapping FOV sensors is to reduce blind spots with the smallest number of sensors, the non-overlapping FOVs introduces challenges to existing correspondence-based sensor calibration methods as shared features do not resolve the extrinsic relationships between the sensors. Specifically, calibration of LiDARs with non-overlapping FOVs using the above described methods may lead to large calibration errors in pairwise calibration, and such pairwise calibration will further accumulate for more than two sensors. Achieving the accuracy requirement of calibration results (e.g., the consistency and colorization of the point cloud) for sensors with non-overlapping FOVs using existing methods is not only more challenging, but also requires more computational power and time.

In addition, the sensors of an AV may shift from their proper positions due to vibration, wind, rain, collisions with other vehicles or objects, or driving over objects or potholes on the road. Given the importance of having properly calibrated AV sensors, validation of sensor calibration is equally desirable.

The disclosure addresses a need in the art for improvements to vehicle sensor calibration technologies by describing methods and apparatus for calibration of multiple LiDAR devices with non-overlapping FOVs. In particular, the systems and methods of this disclosure enable accurate and efficient calibration of at least two LiDAR devices mounted on a vehicle when the FOVs of the LiDAR devices do not overlap. The disclosure utilizes calibration scene with an automated turntable or carousel system that transforms vehicle sensors from an uncalibrated state to a calibrated state.

Figure 2:
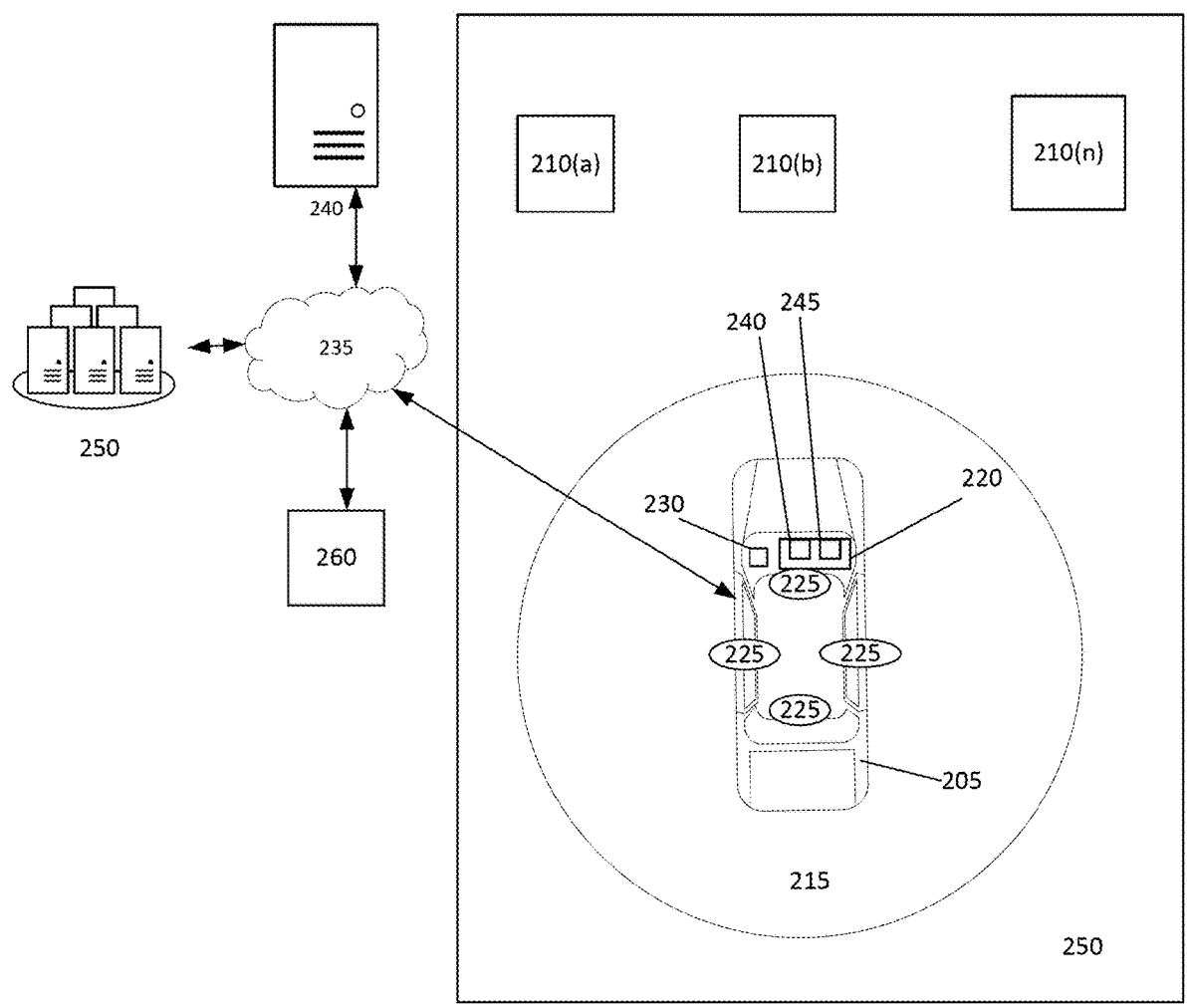
FIG. 2 is an example of a system for performing and/or validating range sensor calibration on an autonomous vehicle, according to various embodiments of the present disclosure.

Referring now to FIG. 2, a system 200 for extrinsic and intrinsic calibration of non-overlapping range sensors is illustratively depicted, in accordance with various embodiments of the present disclosure.

According to various embodiments, the system 200 includes a vehicle 205 (e.g., an AV or another type of vehicle). The vehicle 205 may be mounted on a turntable 215 in a calibration environment 250 that includes one or more calibration targets 210(a)-(n). The calibration targets 210(a)-(n) may have a planar surface and/or may be 3-dimensional shapes (e.g., a cube, hexagonal or tetrahedral volume), any of which may have regions of varying reflective properties. Furthermore, the calibration targets 210(a)-(n) may be positioned in the environment 250 at different known positions and orientations with respect to the vehicle 205 on the turntable 215. Optionally, the calibration targets 210(a)-(n) may include a plurality of unique positional markers (e.g., fiducials including, for example, ArUco markers, 2D markers, QR codes, or any other relevant markers) that can be used to detect a 3D position of the positional markers in 3D space. The turntable 215 may move the vehicle 205 in a clockwise or counterclockwise direction as the vehicle sensors capture sensor data. The turntable may have a flat mounting surface or may have an inclined mounting surface. The inclined surface can cause greater range and incident angle variation for, for example, the laser scanners, allowing for a more robust calibration process than with only a flat surface. Upon sensor calibration, the vehicle 205 may be operated in accordance with the system shown in FIG. 16.

The vehicle 205 may have at least two range sensors (e.g., LiDAR sensors) 225. The one or more range sensors 225 may be positioned at various positions of the vehicle 205 such as, for example, the front, rear, top, and/or sides of the AV 205 and/or any other suitable position or positions. According to various embodiments, at least two of the range sensors 225 have non-overlapping FOVs. The vehicle 205 may include additional sensors such as one or more radio detection and ranging (RADAR) systems, one or more cameras, and/or one or more other suitable sensor types (not shown here). In order to accurately detect these one or more targets 210(a)-(n), a calibration module 260 may perform calibration (extrinsic and intrinsic) and/or calibration validation of the range sensors 225 (e.g., LiDARs) coupled to the vehicle 205 (as discussed below). The calibration module 260 may be included in the vehicle 205 and/or may be remotely located and in communication with the vehicle 205. The vehicle 205 may include one or more computing devices 120 configured to receive sensor data pertaining to the targets 210(a)-(n). The sensor data is generated by one or more range sensors 225 that are coupled to the vehicle 205. A computing device 220 may be in electronic communication with the range sensors 225. The computing device is described more in detail with respect to FIG. 18. As discussed above, a LiDAR sensor captures the amount of time it takes for a light beam from a laser to hit an object in space and reflect back, and thus LiDAR data provides information on direction and distance to the object in space. As such, each LiDAR sensor captures a depth profile comprising a plurality of 3D points corresponding to a distance from the LiDAR sensor to the surface of a calibration target 210 within its FOV. The plurality 3D points may then be used to generate a LiDAR 3D point cloud. A LiDAR 3D point cloud may not necessarily encompass the entirety of a calibration target, and instead may only include a portion of calibration target based on the, FOV, height and location of the LiDAR sensor placed on the vehicle.

The vehicle 205 may include a geographic location system configured to determine a location and orientation of the vehicle 205. The geographic location system may include a Global Positioning System device. It is noted, however, that other forms of geographic location may additionally, or alternatively, be used, such as high-definition maps and programming that is configured to correlate information from sensor data captured by range sensors 225 to data in the maps.

The vehicle 205 may further include a transceiver 230 configured to send and/or receive digital information from a remote server 240 via a wired and/or wireless connection such as, for example, through a wireless communication network 235, wherein the vehicle 205 and the remote server 240 are in electronic communication with each other. The computing device 210 may include a processor 245. The processor 245 may be configured to receive, using the transceiver 230, information pertaining to features of the calibration environment, and use the information to identify one or more of the targets 210(a)-(n). It is noted that the processor 245 may be a standalone processor 245, the vehicle's 205 processor 245, and/or the remote server's 240 processor 245. Data processed by the processor 245 may be data received from the vehicle 205, received from the remote server 240, and/or a combination of data received from the vehicle 205 and the remote server 240. According to various embodiments, the computing device 210 may include one or more digital storage devices 250, and/or some or all of the digital information may be stored locally at the vehicle 205.

To calibrate the plurality of range sensors 225, the vehicle 205 is rotated on turntable 225 by a predetermined degree to capture a plurality of sensor data scans in the environment at each rotational position (e.g., rotating turntable 225 by 25 degrees per scan). Each of the sensors is configured to generate data pertaining to targets 210(a)-n that are within a range of detection and/or FOV of the sensors. A predetermined number of scans is captured (e.g., 20 scans) based on the number of LiDARs so that enough LiDAR data of the plurality of targets 210(a)-(n) is collected to determine an extrinsic calibration of the range sensors with respect to each other, as well as the position, rotation, range and/or other intrinsic calibration factors of the range sensors.

The calibration module 260 is configured to perform extrinsic calibration, intrinsic calibration and/or validate whether a sensor calibration is correct in accordance with the methods of this disclosure. Optionally, information about the calibration may be stored in a data store and made available to the calibration module 260. In some embodiments, after the vehicle 205 has been initially calibrated at a facility, the data store may store calibrated sensor models (e.g., LiDAR model) and/or calibration references of how properly calibrated sensors for the vehicle 205 should behave and/or perceive information. Periodic in-field measurements of sensors may be compared to the calibration reference to determine whether recalibration of sensor(s) is necessary (discussed below).

It should be noted that a variety of LiDAR sensors may benefit from calibration using the systems and methods of this disclosure. For example, the LiDARs calibrated may be components of autonomous vehicles used for navigation or object recognition. Further, the LiDARs calibrated may have a variety of different features (e.g., varying ranges, different FOVs, different resolutions, etc.). It should also be noted that the systems and methods of this disclosure may be used for calibration and/or calibration validation of other range sensors such as, without limitation, RADAR, SONAR, or the like. In addition, some sensors can be calibrated together or jointly, such as, for example, the RADAR sensor and the LiDAR sensor, while other sensors such as the cameras are calibrated separately.

Before describing particular embodiments for facilitating or validating calibration, it should be noted that extrinsic calibration is performed on the sensors to refine initial knowledge of the locations and orientations of the sensors, so that the data from the sensors are all measured with reference to a global reference frame. It should be noted that intrinsic calibration provides internal parameters of each sensor, while extrinsic calibration provides relative transformation from one sensor coordinate frame to the other (or with respect to a global reference frame or a vehicle reference frame). Intrinsic parameters of a LiDAR sensor are necessary to link coordinates of individual points in a point cloud with corresponding coordinates in a LiDAR reference frame. Solving the extrinsic calibration problem requires finding correspondences in the data acquired by intrinsically calibrated sensors. In some instances, a calibration can be performed for a single extrinsic characteristic (e.g., yaw), while in some instances, a calibration can be performed for any number of extrinsic characteristics (e.g., six degrees of freedom, such as x-location, y-location, z-location, roll, pitch, and yaw). Similarly, in some instances, a calibration can be performed for a single intrinsic characteristic (e.g., azimuth offset), while in some instances, a calibration can be performed for any number of intrinsic characteristics.

By calibrating one or more sensors via the calibration techniques described herein, the one or more sensors can generate data representing an environment of an AV with a high degree of accuracy and precision about the environment. For example, sensors such as LiDAR sensors, radar sensors, sonar sensors, and the like that have been calibrated in this manner can provide more accurate data for segmentation, classification, route planning, etc., which can ultimately lead to better outcomes while driving. Furthermore, improved calibration of sensors may improve processing in perception systems, for example, by providing more accurate data as a starting point for segmentation, classification, etc. These and other improvements to the functioning of a computing device are discussed herein.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or during use, and is not limited to AVs. In another example, the methods, apparatuses, and systems may be utilized in an aviation or nautical context. Additionally, the techniques described herein may be used with real data (e.g., captured using sensor(s)), simulated data (e.g., generated by a simulator), or any combination of the two.

Figure 3:
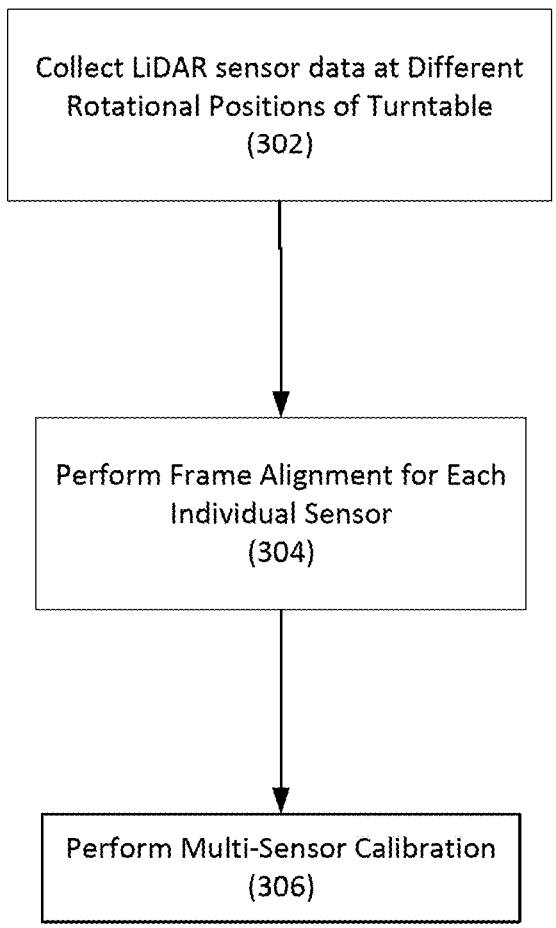
FIG. 3 illustrates various aspects of a method for performing extrinsic sensor calibration of sensors mounted on a vehicle with non-overlapping FOVs, according to various embodiments of the present disclosure.

Extrinsic Calibration:

Referring now to FIG. 3, a method for performing extrinsic calibration of one or more LiDARs mounted on a vehicle with non-overlapping FOVs is illustratively depicted, in accordance with various embodiments of the present disclosure. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order.

At 302, the methods can include collecting sensor data by the LiDAR sensors at regular intervals as the turntable, on to which vehicle is mounted, is rotated. For example, the one or more of the LiDAR sensors may detect return signals from one or more of the plurality of targets in the calibration environment of FIG. 2. The sensor data may be collected in the sensor reference frame (e.g., a Cartesian reference) frame of each sensor (e.g., LiDAR reference frame). In some examples, the vehicle can go through multiple rotations via the turntable. In various embodiments, the turntable may be controlled to rotate at certain speeds and/or stop at predetermined angular locations depending on the relative positioning of the calibration targets and the LiDAR sensors of the vehicle for performing calibration. For active control implementations, the system can also adjust a pitch and/or roll of the turntable platform to increase range and incident angle variations of the LiDARs.

Figure 4:
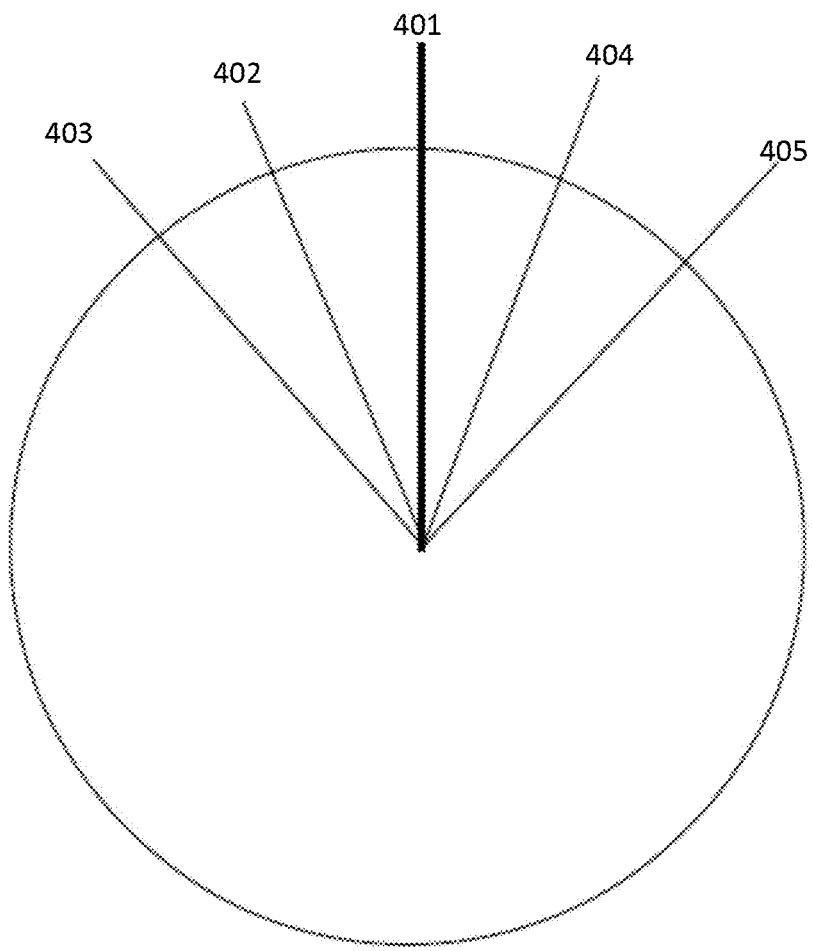
FIG. 4 illustrates an example collection of sweeps by a range sensor using a rotating platform.

In various embodiments, as the turntable rotates, LiDAR data from each LiDAR sensor in the form of LiDAR sweeps is collected, where a LiDAR sweep is a collection of LiDAR scans aggregated over a predetermined time period. In various embodiments, the rotation of the turntable may be stopped at regular time intervals for collection of the LiDAR sweeps. The regular intervals of data collections (i.e., the predetermined time period) may be determined based on the LiDARs FOV such that multiple sweeps of the same LiDAR share a common view of the calibration environment or scene, while taking into account resources required for data collection and processing (e.g., computational costs). Specifically, the higher the number of overlapping sweeps, the more constrained and reliable the calibration problem is, but it comes at the cost of more resource intensive data collection and processing. In various embodiments, the system may determine these regular intervals such that each sweep can be at least partially matched with at least "n" number of adjacent sweeps (i.e., a window of sweeps) before and/or after that sweep in space (n=1, 2, 3, 4, . . . ). For example, if the data collection over the extent of the turntable's full rotation is every 10 degrees, there will be 36 data collections or sweeps where each may be labeled in order as [0, 1, . . . , 35]. In this example, if n=2, the adjacent sweeps for sweep number 1 are sweep numbers [35, 0, 2, 3] as shown in FIG. 4 (each line indicates a sweep collection location of the rotating platform: 401—sweep 1, 402—sweep 0, 403—sweep 35, 404—sweep 2, and 405—sweep 3). Furthermore, if the FOV of a LiDAR sensor is at least 40°, sweep 1 (401) will at least partially overlap with the adjacent sweeps [35, 0, 2, 3]. Similarly, if n=1, the adjacent sweeps for sweep number 1 are sweep numbers [0, 2], and sweep 1 will partially overlap with seeps 0 and 2 if the FOV of the LiDAR sensors is at least 20°.

The methods may continue to 304 to perform frame alignment corresponding to each individual LiDAR sensor to transform the sensor data of each sensor from the sensor's Cartesian reference frame to a global reference frame that is the same for all sensors. For the frame alignment of a LiDAR sensor, the method may include performing an inter-sweep alignment followed by global alignment of multiple sweeps using, for example, pose graph optimization.

Figure 5:
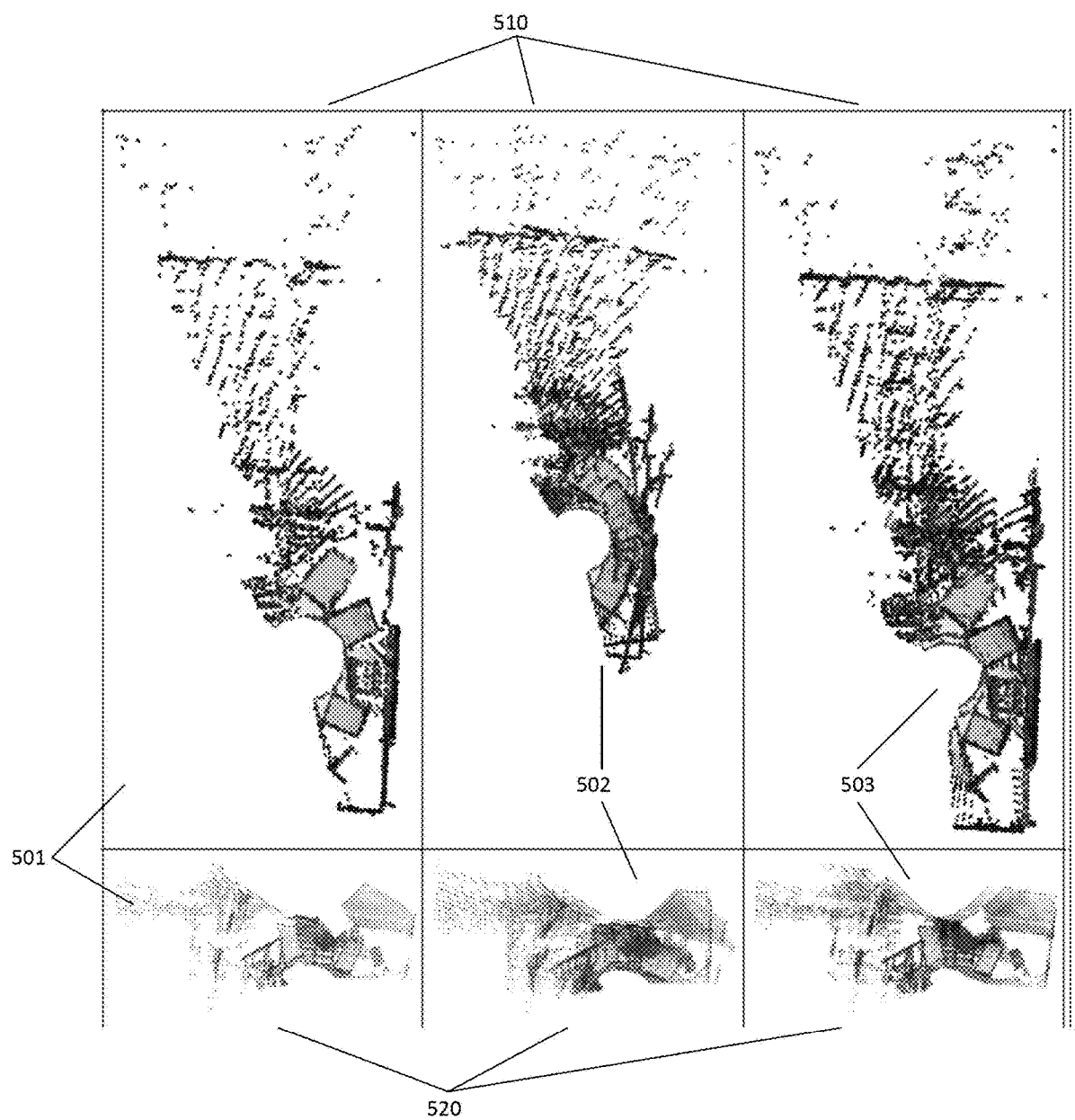
FIG. 5 illustrates an example inter-sweep alignment using ICP in accordance with the methods of this disclosure.

The inter-sweep alignment step compares the sweep scan data of a reference sweep (arbitrarily chosen) with the scan data associated with each of the other sweeps in the chosen window (e.g., n=2) and determines a relative transform between the reference sweep and each of the other sweeps to generate an aggregate aligned sweep (including the reference sweep and 4 other sweeps in the window when n=2). For example, FIG. 5 illustrates sweep alignment for a window size of n=1 where a reference sweep 501 is aligned with two of its immediately adjacent sweeps 502 to generate an aligned sweep 503 including scan data of 3 sweeps. In FIG. 5, the top views 510 is a bird's eye view of the calibration environment, while the bottom views 520 illustrate a 3D view.

For LiDAR sensors, the scan data resembles point clouds, and the alignment determines the relative transform between the scan data of the reference sweep and each of the other sweeps using, for example, an iterative closest point technique such as, without limitation, point-to-point ICP, point-to-plane ICP, or an alternate ICP technique. Because the reference sweep and each of the other sweeps in the window have at least a partial overlap (based on the selection of the window size as discussed above), the corresponding scans are associated with at least a section of the calibration environment that is common between the sweeps being aligned. As such, the alignment may detect common points and/or features (e.g., edges, planes such as surface normals, voxels, curvature, density, or the like) between the reference sweep point cloud and each of the other point clouds. Specifically, common points and/or features may be detected and aligned such that common points and/or features from the reference sweep and another sweep can be brought into coincidence by one rigid transformation. In other words, using the relative transform and the identified common points and/or features in each set of scan data, the reference sweep scan data may be aligned with scan data of each of the other sweeps in the window to aggregate all of the sets of scan data into an aggregate representation of the surrounding environment, for example, a point cloud representation.

An ICP technique may be generally employed to minimize the difference between two or more point clouds. In some examples, the methods may also minimize of range-based uncertainty. In some embodiments of the ICP technique, one point cloud (e.g., point cloud of the reference sweep) may be kept fixed, while the point cloud corresponding to another sweep from the window (e.g., source point clouds), may be transformed to best match the reference point cloud. The ICP technique may iteratively revise the transformation (e.g., combination of translation and rotation) in order to minimize an error metric. In various embodiments, the error metric may be, for example, a distance from the source point cloud to the reference point cloud (e.g., the sum of squared differences between the coordinates of the matched pairs). In some implementations, the ICP may align scan data (e.g., point clouds) given an initial guess of the transformation which is subsequently iteratively refined. Specifically, given an initial estimate, ICP minimizes the Euclidean distance between pairs of matching points from both point clouds (present given the overlap between sweeps) in an iterative manner. For aligning more than two point clouds, the ICP may be performed in a pairwise manner with the same reference point cloud.

In some embodiments, the system receives as input a reference point cloud and a source point cloud, an initial estimation of the transformation to align the source point cloud to the reference point cloud, and some criteria for stopping the iterations. The system may perform the ICP technique to generate a refined transformation, for example, the transformation to determine the pose of the vehicle (or the LiDAR) given the calibration environment and the known rotational position of the turntable. For example, for each point in the source point cloud, the system may identify a match point in the reference point cloud (or a selected set). The system may then estimate the combination of rotation and translation (e.g., a transformation function) which will best align each source point to its match found in the previous step. In some embodiments, the system may use a root mean square point to point distance metric minimization technique for estimating the combination of rotation and translation. The system may, optionally, weigh points (e.g., using a cost function) and reject outliers prior to alignment. The system may then transform the source points using the obtained transformation. The system may next repeat these actions (e.g., by re-associating the points, and so on) until a predetermined stopping criteria is met such as, without limitation, convergence (i.e., a transformation between the sweeps is found such that no improvement in the closest neighbors is possible), a maximum number of iterations is reached (e.g., 100, 150, 200, or the like), relative reduction in the estimated parameters within the inner iterations of ICP is under a threshold (e.g., about $1\times10^{-6}$), relative reduction is the nearest neighbor distance drops below a threshold (e.g., about $1\times10^{-3}$), or the like.

Optionally, the system may reduce processing complexity of the ICP by including data filters such as, without limitation, bounding box filter, voxelization filter, octree grid filter, observation direction filter, surface normal filter, orient normal filter saliency filter, maximum density filter, random sampling filter, distance based filter, normal space sampling filter, shadow point filter, and/or the like. Such filters process an input point cloud into an intermediate point cloud used in the alignment procedure.

For example, a surface normal filter may be implemented by estimating a surface normal to each point by finding a number of neighboring points and taking the eigen-vector corresponding to the smallest eigen-value of all neighboring points. Specifically, the surface normal is estimated by eigen-value decomposition of the covariance of points within a predefined neighborhood of the point, and the eigen-value may be used as an uncertainty measure of planarity for the purpose of filtering of point cloud data (i.e., feature extraction).

In an example with a voxelization filter, instead of matching individual points, the system may implement ICP over a pyramid of point-clouds voxelized using multiple voxel sizes ranging from coarse to fine. Voxelization refers to the process of downsampling the input point cloud such that a single point is selected in a voxel (cube) of a given dimension. The point cloud maybe dynamically divided into multiple voxels of different sizes. In some examples, each voxel may be associated with statistical data representing multiple data points, such as, but not limited to, a number of data points, an average position of the data points, a covariance of the data points, and the like. As such, data received from a sensor (i.e., a point cloud) may be used to populate one or more voxels. For example, the maximum and minimum values of the x, y and z axis of an input point cloud may be calculated, and a three-dimensional bounding box according to these values may be established. The bounding box may be divided into small cubes with the assigned voxel size, such that all points in the small cube are represented as a single point such as the center of gravity of the small cube and/or an average of all points. In this way, multiple points inside the voxel are represented by one point, and the point cloud is reduced. Additionally, in the first step of ICP, voxel (rather than point) correspondences are made. Optionally, voxel shape parameters or features (e.g., surface normal, density, and curvature) are also incorporated to ensure that local 3D structure around the points are considered for the determination of the data association between two point clouds. Surface normal estimation may be performed per voxel-level independently.

In various embodiments, the initial alignment transformation during ICP may use the output of a larger voxel size as its starting point for subsequent iterations for smaller voxel sizes. For example, the sequence of voxel sizes used for registration (in meters) could be: [0.2, 0.1, 0.05, 0.0], where a zero-voxel size indicates no voxelization operation is performed. The alignment may be performed by continuously refining the voxel space from a coarse discretization to a fine discretization.

Estimating surface normals per point (and/or feature and/or filtered data point) in the voxelized point cloud (or initial) may be performed using, for example, local surface fitting, Delaunay algorithms, Voronoi algorithms, robust statistics, or the like. For example, a 3D plane may be fitted using the set of point neighbors in a fixed neighborhood where surface normal estimation neighborhood size depends on the density of the sensor data and/or the calibration environment. In various embodiments, the neighborhood size maybe about 0.1-0.6 meters, about 0.2-0.5 meters, about 0.3-0.4 meters, about 0.2 meters, about 0.3 meters, about 0.4 meters, about 0.5 meters, or the like. As an additional robustness measure, the methods may not make use of points with insufficient neighbors. For example, if a point has under $N=10$ neighbors within $S=0.3$, that point is removed from the registration process.

Next, the aligned sweeps per window (relative to the aligned reference sweep of that window) may be used for performing global alignment of all the sweeps of that LiDAR sensor using pose graph optimization. Specifically, the point cloud from each LiDAR sensor is provided in a global reference frame. Optionally, the methods may include determining whether the inter-sweep alignment was successful before performing the global alignment. The system may only use the sweeps for which inter-sweep alignment was successful for performing global alignment, and perform additional processing for integrating the remaining sweeps into one point cloud during global alignment. Optionally, if the alignment is determined to be unsuccessful for a threshold percentage of neighboring sweeps (e.g., greater than 50%, greater than 60%, greater than 70%, or the like).

For an inter-sweep alignment that aligns a reference sweep with each of the other sweeps in its corresponding window, the system may determine that the inter-sweep alignment was successful based on an analysis of an overlap percentage, a final alignment error, or a combination thereof.

The overlap between two LiDAR sweeps (a reference sweep and a source sweep) may be defined as the number of points from the reference sweep whose closest neighbors from the source sweep are within a threshold distance post alignment. The threshold distance may be about 0.3-0.7 meters, about 0.4-0.6 meters, about 0.4 meters, about 0.5 meters, about 0.6 meters, or the like. The overlap percentage threshold may be selected based on prior knowledge of data collection such as, without limitation, sensor placement, field-of-view, an amount of rotation between subsequent data collections, or the like (where these factors are included into the system design to ensure a minimum overlap percentage that guarantees reliable alignment). The system may determine that the inter-sweep alignment was successful if the overlap percentage is determined to be at least about 25-35%, about 27-33%, about 29-31%, about 25%, about 30%, about 35%, or the like.

The final alignment error between two LiDAR sweeps (a reference sweep and a source) may be defined as the average distance between all overlapping points (i.e., points that are within the threshold distance). A threshold on the final alignment may be selected based on prior knowledge of data collection. The system may determine that the inter-sweep alignment was successful if the final alignment error is determined to be less than about 2-8 cm, about 3-7 cm, about, 4-6 cm, about 5 cm, about 4 cm, about 6 cm, about 7 cm, or the like; computed over the overlapping points between the point cloud (either point to point or point to plane).

For performing global alignment, the system may use one of the data collection sweeps as a reference frame for the LiDAR sensor (e.g., without limitation, the first seep), and use the alignment output (i.e., the transformation associated with each successful inter-sweep alignment) to construct, from the inter-sweep alignments, a pose graph with nodes encoding an estimated pose of the LiDAR sensor (during collection of a sweep) and edges indicating the relationships between the nodes. Specifically, a node of the graph is a pose of the LiDAR at which a particular sweep is taken. Here a pose can be a three-dimensional vector consisting of a 2D LiDAR position (optionally, in the vehicle reference frame) and the orientation of the sensor. Loop closure constraints (as the ICP transformation from inter-sweep alignment) may be added as edges between nodes where the inter-sweep alignment is determined to be successful between the corresponding nodes such that the loop closure constraints constrain the location of a pose with respect to a reference pose. Furthermore, odometry constraints may also be added as edges between the nodes, where the odometry constraints predict a next pose from a given reference pose. In various embodiments, the odometry constraints may be estimated relative to the reference sweep and may accumulate over time across all sweeps. Odometry may be defined as the relative motion between consecutive frames. As such, odometry may be integrated relative to a reference frame and added as an additional constraint in global alignment. For example, when a reference frame is assumed to be the origin (e.g., zero rotation), and if the rotating platform is configured to rotate 10 degrees per collection/sweep, then the rotation of each LiDAR sweep starting from the origin will be 10 degrees, 20 degrees, 30 degrees, an so on which can be used to generate the odometry constraints.

In some embodiments, the graph optimization methods used may also account for the confidence in the loop closure constraints (i.e., the ICP transformation). For example, the final alignment error determined above may also be used as a measure of alignment uncertainty such the edge weight of the loop closure constraint is inversely proportional to the alignment error.

Figure 6:
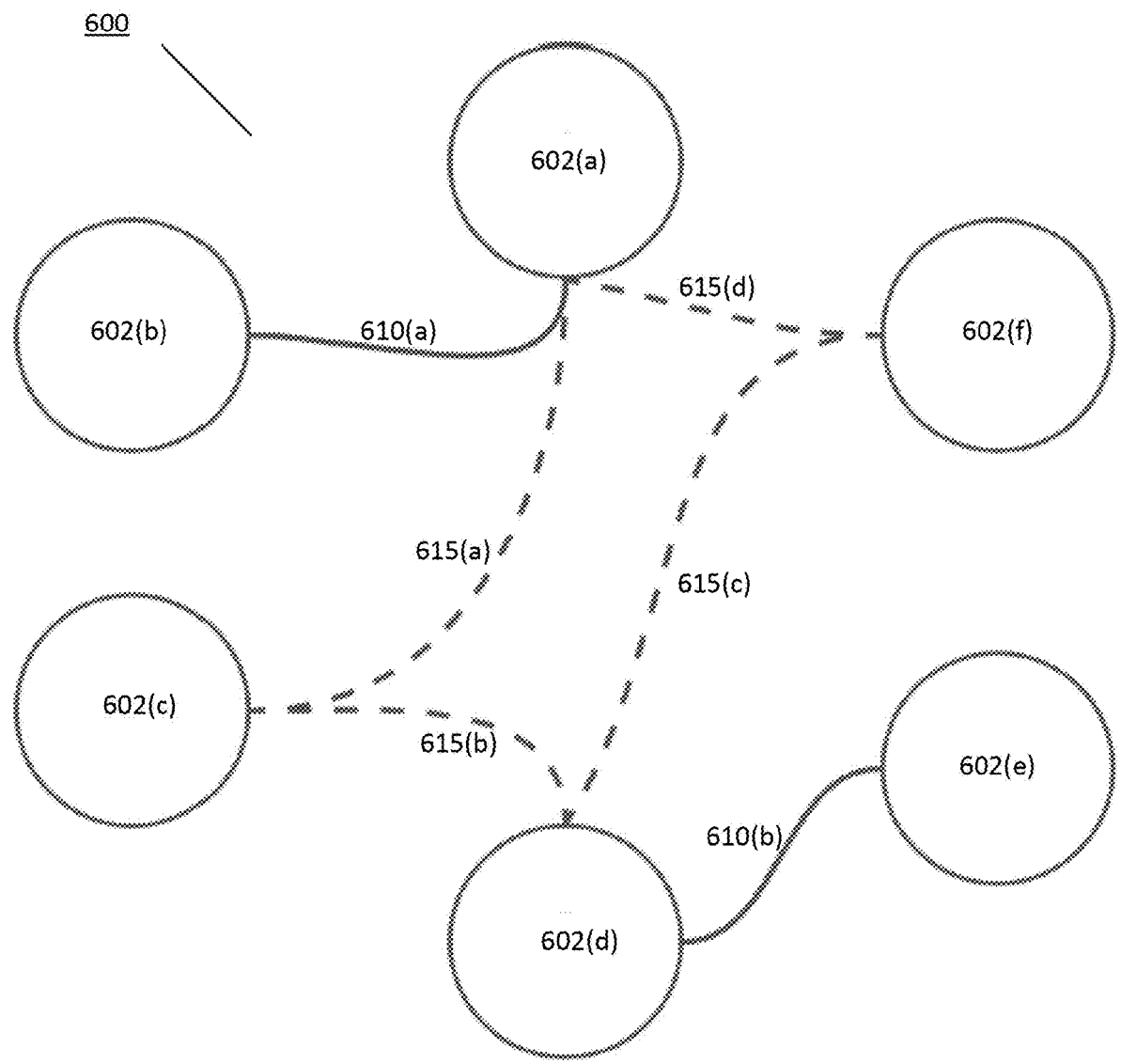
FIG. 6 illustrates an example pose graph structure.

For example, FIG. 6 illustrates an example pose graph structure 600 for 6 LiDAR sweeps [0, 1, 2 . . . 5] and an inter-sweep alignment window size of n=1. In FIG. 6, the nodes 602(*a*)-(*f*) represent the LiDAR poses during collection of each of the sweeps, the solid edges 610(*a*) and 610(*b*) are odometry edges, and dashed edges 615(*a*)-(*d*) indicate loop closure edges. Solid lines are the odometry edges that connect consecutive frames in order (e.g., 602(*a*)-(*b*) and 602(*d*)-(*e*)). Specifically, non-consecutive frames are used for pose graph (global optimization) constraints. The dashed lines are loop closure constraints and they connect nonconsecutive sweeps.

The pose graph is then input to a graph optimizer algorithm to compute an optimized set of poses corresponding to the nodes in a global reference frame. Graph optimization algorithms take as input an initial estimate of the trajectory of sensor from one pose to the next (from the odometry measurements) and a set of loop closure constraints and attempts to find an optimal set of poses subject to a set of transform constraints that relate them. Examples of graph optimizer algorithms may include, without limitation, Levenberg-Marquardt algorithm with robust loss functions, Gauss-Newton, Powell Dogleg, to the like. This process may be iterated until, for example, all odometry measurements have been used, a maximum number of iterations have been performed (e.g., 100, 150, 200, or the like), the relative change in estimated parameters drops below a threshold (e.g., $1 \times 10^{-6}$), or the like.

Figure 7A:
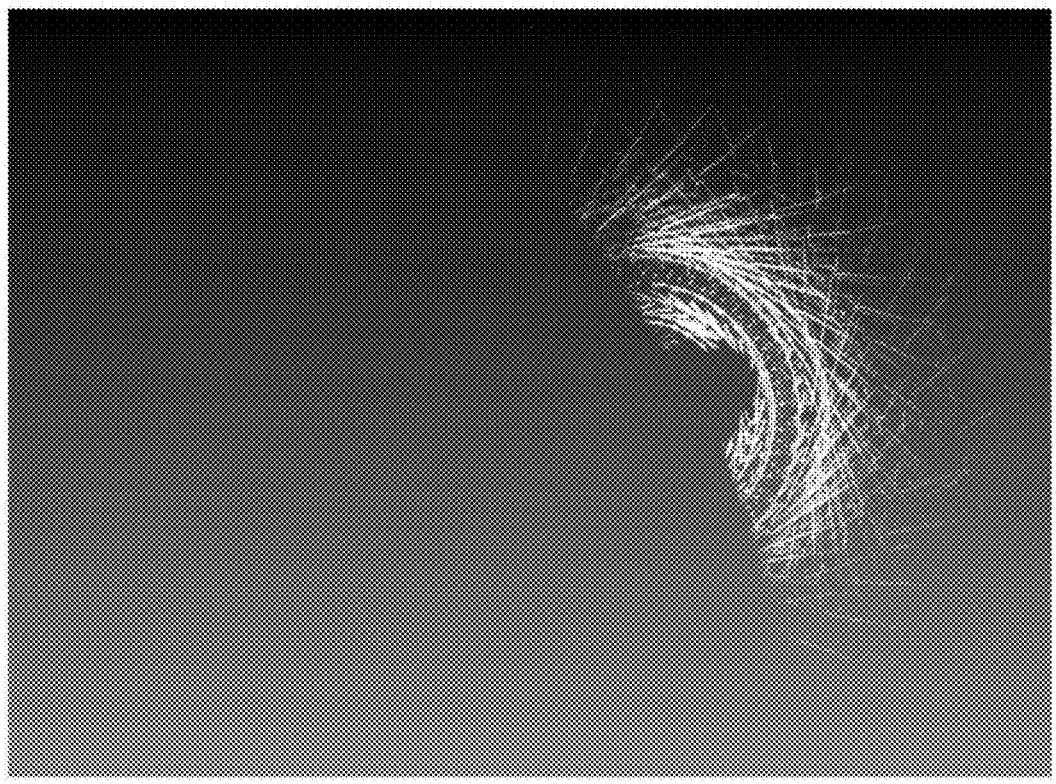
FIG. 7A illustrates a point cloud data collected by LiDARs of a vehicle mounted on a rotating platform.
Figure 7B:
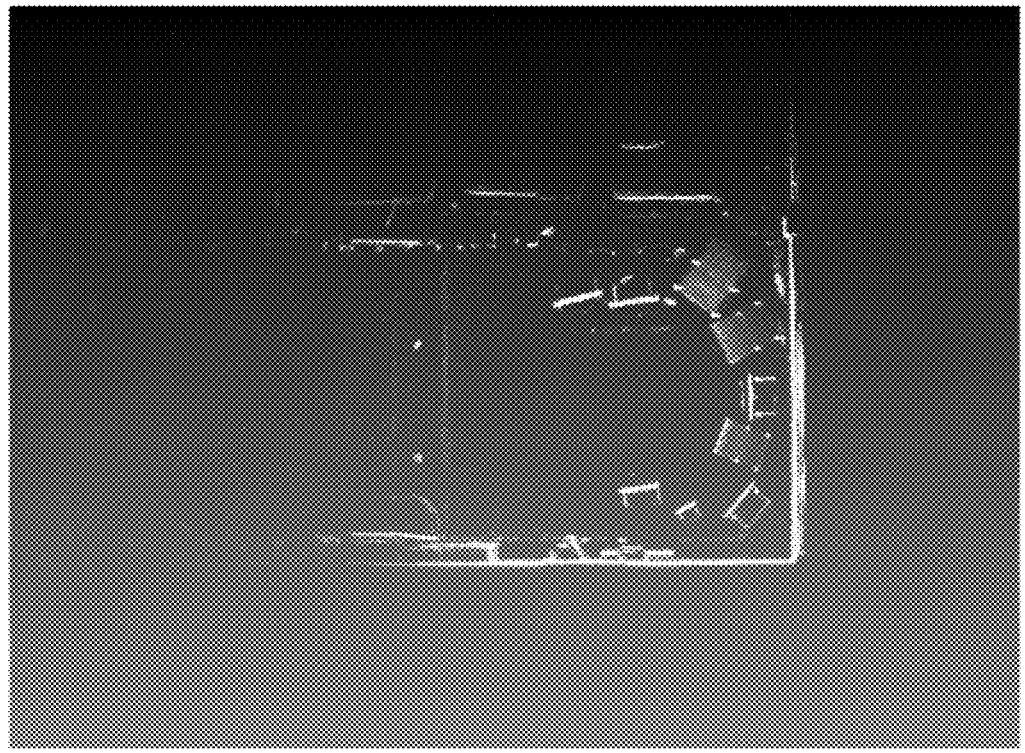
FIG. 7B illustrates a point cloud generated from an initial point cloud of FIG. 7A after inter-sweep alignment in a global reference frame.

A globally consistent reference frame for each LiDAR sensor is thus obtained where individual LiDAR scans collected per platform rotation are aggregated into their own globally consistent coordinate frame. Specifically, a point cloud representation of the calibration environment (i.e., a sensor frame) is created based on the sweeps obtained from the LiDAR sensor at various locations of the turntable. Moreover, each sweep may be individually timestamped using the best estimates of the LiDAR temporal calibration parameters, and the LiDAR poses may then be interpolated to the corrected timestamps to convert the scans into the global reference frame. FIG. 7B illustrates the LiDAR sweeps aligned in a global reference frame using the methods of this disclosure from the initial sweeps illustrated in the sensor coordinate frame (shown in FIG. 7A).

The method may then continue to 306 to perform multi-sensor calibration using the globally consistent frames of each of the sensors from step 304.

For performing the multi-sensor calibration, one of the sensors is arbitrarily selected as a reference sensor. Next, the point cloud (in the global reference frame) of each of the other sensors is pairwise aligned with that of the reference sensor using the above discussed ICP algorithm. Since the aggregated point cloud per sensor is collected on a rotating platform, all sensors will be able to scan the calibration scene entirely thereby resolving the lack of overlap between the sensor for performance of the ICP.

As discussed above, various filters may be used to downsample the point clouds to be aligned and reduce the processing complexity of the ICP.

Figure 8A:
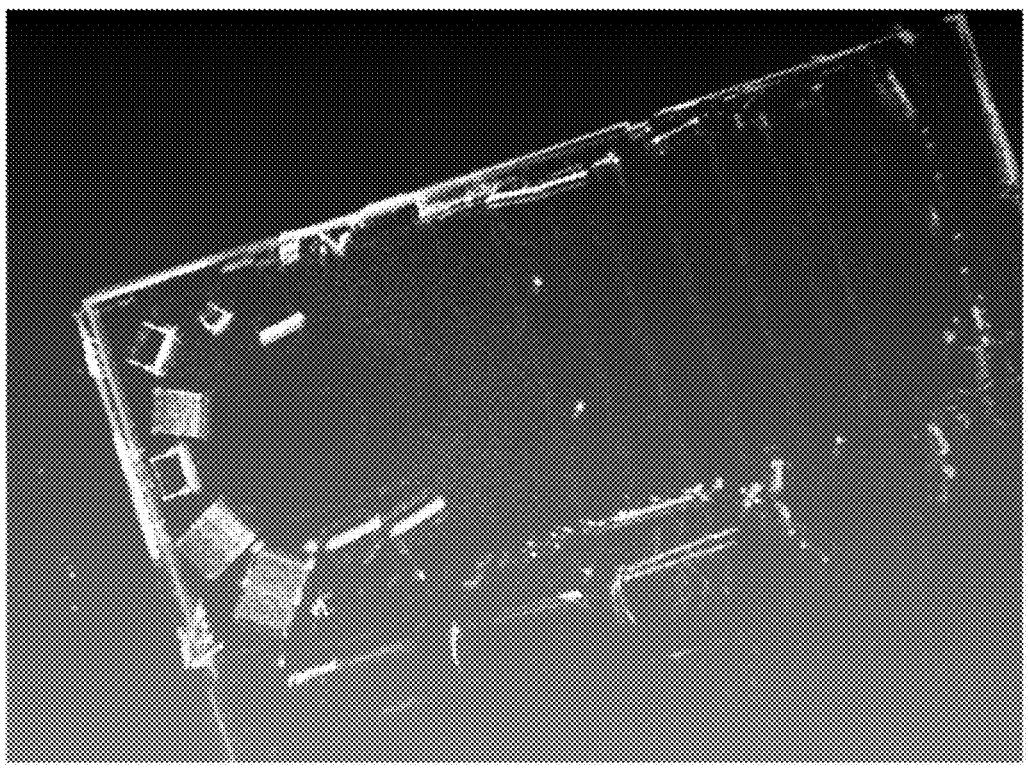
FIG. 8A illustrates an example point cloud registration after pairwise alignment.

Optionally, an initial estimate of the source sensor position relative to the reference sensor may be derived using measurements from a CAD model of sensor installment on the platform, and may be used for determining the initial transformation for the ICP. FIG. 8A illustrates the alignment result using the initial transformation that is iteratively refined using ICP until a final condition is achieved (e.g., a maximum number of iterations, threshold overlap percentage, relative reduction in the estimated parameters within the inner iterations of ICP is under a threshold, relative reduction is the nearest neighbor distance drops below a threshold, change in the closest neighbor per point is stabilized, or the like).

The system may, optionally, determine if a pairwise sensor alignment is successful based on an overlap percentage metric. The overlap between the frames of two LiDARs (i.e., the reference LiDAR and another LiDAR) may be defined as the number of points from the point cloud frame of the reference LiDAR whose closest neighbors from the rom the point cloud frame of the source LiDAR are within a threshold distance post alignment. The threshold distance may be about 0.3-0.7 meters, about 0.4-0.6 meters, about 0.4 meters, about 0.5 meters, about 0.6 meters, or the like. The overlap percentage threshold may be selected based on prior knowledge of data collection such as, without limitation, sensor placement, field-of-view, an amount of rotation between subsequent data collections, or the like. The system may determine that the inter-LiDAR alignment was successful if the overlap percentage is determined to be at least about 70-99%, about 75-95%, about 80-90%, about 75%, about 80%, about 85%, or the like.

Figure 8B:
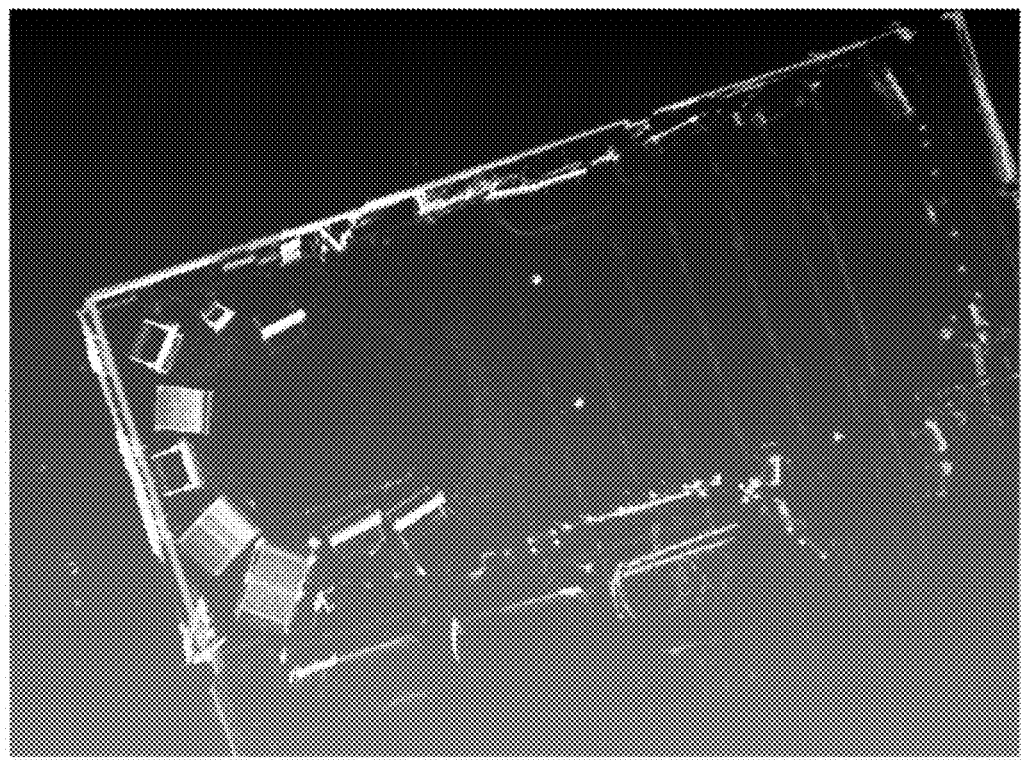
FIG. 8B illustrates an example point cloud registration using after global pose alignment using a pose graph.

FIG. 8B illustrates the final alignment result when the sensors are extrinsically calibrated with respect to each other using the methods disclosed in this disclosure. In various embodiments, the final alignment of the extrinsically calibrated LiDAR sensors may be used to estimate the relative poses of the LiDARs.

Intrinsic Calibration

Figure 9:
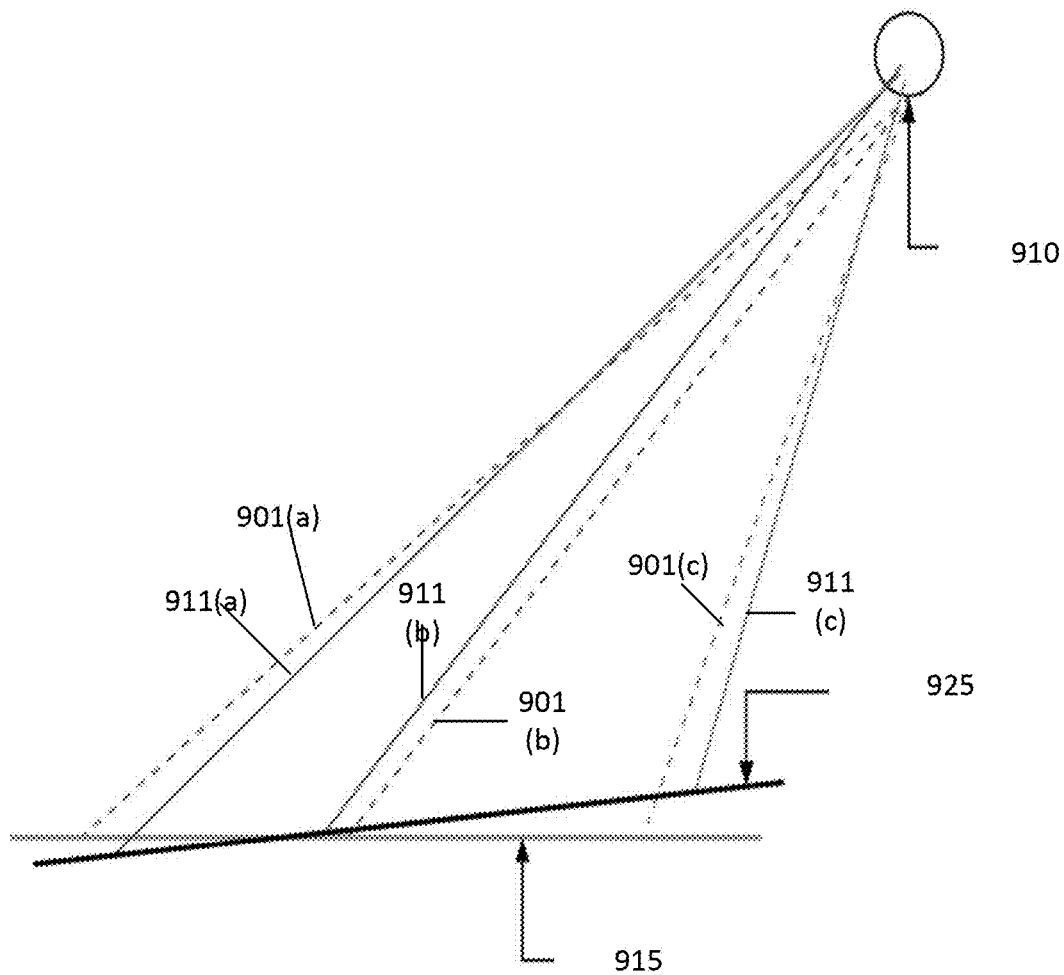
FIG. 9 illustrates an example of a measured surface when the intrinsic calibration of a LiDAR sensor is inaccurate.

A multi-beam LiDAR system is modelled as a set of rays, i.e. straight lines. These rays define the position and orientation of laser beams in a sensor-fixed coordinate frame. The intrinsic calibration for such systems is the estimation of parameters that define the position and orientation of each of the laser beams. Precise estimation of the beam parameters (e.g., beam angle pointing) is important to ensure a faithful representation of LiDAR scans of the environment. The intrinsic calibration plays an important role in the processing chain as it directly affects the performance of all algorithms applied to the sensor data. For example, as shown in FIG. 9 a detected planar surface is inaccurately measured from multiple beams of the LiDAR due to errors in the intrinsic calibration of the LiDAR sensor. Specifically, when the LiDAR is intrinsically calibrated, the beams 901(a)-(c) share the same origin 910 and their elevation angle estimates are correct resulting in a true measurement of a surface 915. However, when the intrinsic calibration is inaccurate, the beams 911(a)-(c) do not share the same origin and their elevation angle estimates are incorrect resulting in an erroneous measurement of a surface 925. While a LiDAR may be factory calibrated intrinsically, such factory calibration may not be accurate enough for several application (e.g., autonomous vehicle navigation). Additionally, the factory provided calibration parameters may show an accuracy loss over time due to sensor wear and tear. Therefore, the need to recalibrate or improve an intrinsic sensor calibration is required.

Figure 10:
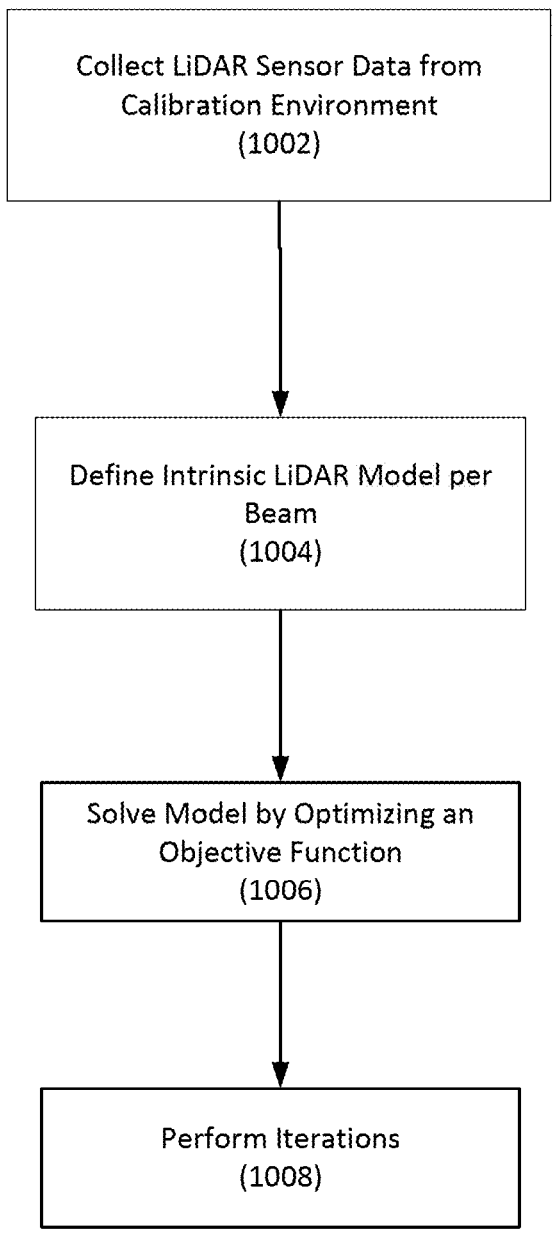
FIG. 10 illustrates various aspects of a method for performing intrinsic sensor calibration of a LiDAR mounted on a vehicle, according to various embodiments of the present disclosure.

Referring now to FIG. 10, a method for performing intrinsic calibration of one or more LiDARs in a vehicle is illustratively depicted, in accordance with various embodiments of the present disclosure. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order.

At 1002, sensor data is collected from the LiDAR sensor with respect to the calibration environment. The calibration environment may be configured to include diverse structures in 3D space. LiDAR sensor data can include horizontal angle, vertical angle, and distance. These observations are given as a result of scanning of a LiDAR, but the values of the intrinsic parameters contained are unknown. Thus, estimating the intrinsic parameters is the main purpose of the intrinsic calibration. Typically, the intrinsic parameters of a LiDAR are defined as the offsets of the origin and the offsets of angles.

Figure 11A:
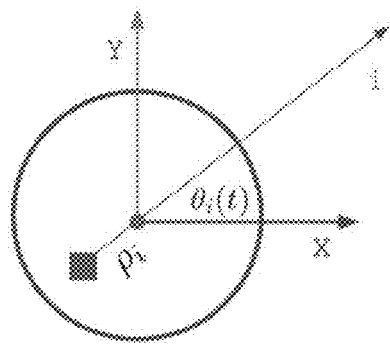
FIGS. 11A and 11B illustrate example geometric representations of LiDAR intrinsic parameters in the LiDAR's coordinate frame from a top view and a side view, respectively.
Figure 11B:
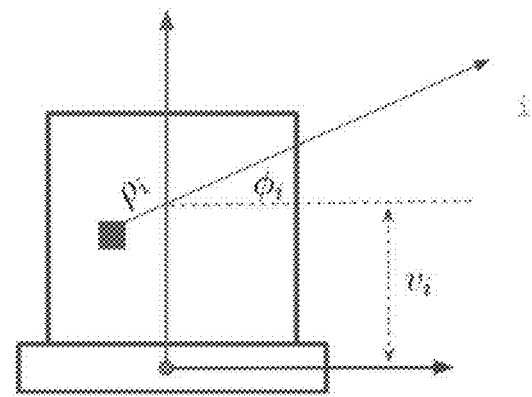

Next at 1004, the method may include defining an intrinsic LiDAR model per beam. A revolving-head 3D LiDAR consists of K conic laser scanners mounted on a rotating head so that they span a 360° panoramic (azimuth) view (as shown in FIGS. 11A and 11B). Such a LiDAR with multiple laser beams measures the ranges given by individual laser heads pointing to different elevation angles. Each laser scanner has a horizontal offset from the axis of rotation, and a vertical offset from adjacent laser scanners. In addition, each laser scanner points to a different elevation angle, such that, collectively, all of the laser scanners cover a portion of the vertical field of view. Therefore, a LiDAR's intrinsic model (when the LiDAR is intrinsically calibrated) per beam may be defined as the LiDAR point measurements (in the coordinate frame corresponding to the $i^{th}$ laser scanner):

$$\begin{pmatrix} x \\ y \\ z \end{pmatrix} = r_{ik} \begin{pmatrix} \cos \phi_i \cos \theta_{ik} \\ \cos \phi_i \sin \theta_{ik} \\ \sin \phi_i \end{pmatrix} \text{ where, } i = 1, 2 \ldots K;$$

$r_{ik}$=range measurement from the at time $k^{th}$ shot of $i^{th}$ beam;

$\phi_i$=elevation angle of the $i^{th}$ beam;

$\theta_{ik}$=azimuth measurement of the $i^{th}$ beam for time/firing k;

such that, direction of the kth shot of the ith laser beam=

$$\begin{pmatrix} \cos \phi_i \cos \theta_{ik} \\ \cos \phi_i \sin \theta_{ik} \\ \sin \phi_i \end{pmatrix}$$

Figure 12:
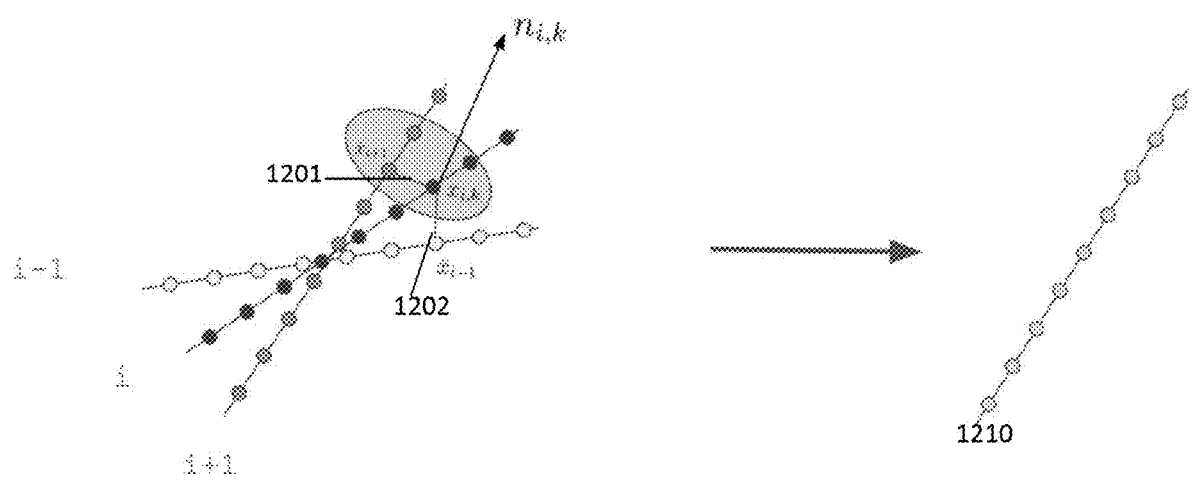
FIG. 12 illustrates a schematic representation of intrinsic calibration of LiDAR beams such that multiple planes measured due to inaccurate calibration converge into a single plane measurement.

However, the above ideal model is not accurate since spatial offsets exist between laser heads, and non-negligible errors exist in both the range measurement and the azimuth angle. The real distance to a point that reflects the $k^{th}$ shot of the $i^{th}$ laser beam is $\alpha_i(r_{ik}+\delta_{\rho i})$, where αi is the scale factor, and $\delta_{\rho i}$ is the range offset due to the delay in the electronic circuits of the LiDAR and the offset of each laser scanner from its cone's center. Specifically, range measurements are corrected using a linear model (gain αi and bias $\delta_{\rho i}$). Similarly, for each beam, the offset in the beam elevation angle may be $\delta\phi_i$ and the offset in the azimuth measurement may be $\delta_{\theta i}$. A z-offset (vertical) offset ($\delta v_i$) may be used to account for the height of each beam from the LiDAR's center $$\begin{pmatrix} x \\ y \\ z \end{pmatrix} = \alpha_i(r_{ik} + \delta\rho_i) \begin{pmatrix} \cos(\phi_i + \delta\phi_i) \cos(\theta_{ik} + \delta\theta_i) \\ \cos(\phi_i + \delta\phi_i) \sin(\theta_{ik} + \delta\theta_i) \\ \sin(\phi_i + \delta\phi_i) + \delta v_i \end{pmatrix}$$

of projection. As such, the position of the $k^{th}$ point measured by the $i^{th}$ laser scanner is described using the following model:

At 1006, calibration is performed using the sensor data to solve the model for the intrinsic LiDAR parameters by optimizing an objective function. The intrinsic calibration is performed such that output intensity per beam is consistent in order to obtain similar intensity measurements per beam after intrinsic calibration. Specifically, after intrinsic calibration, each beam of the LiDAR should provided similar (and/or consistent) intensity when observing the same surface. Specifically, the method generates an objective function for performing intrinsic calibration by estimating one or more of the optimization parameters (per beam) of the LiDAR to minimize the systematic error caused by the intrinsic parameters in terms of plane deviation. The optimization parameters may be the azimuth offset, the elevation offset, the range offset, the z-offset, or the like, and collectively denoted by $K_i$. For optimizing a beam, the optimization parameters ($K_i$) may be estimated such that the closest point distance to all the other LiDAR beams may be minimized (i.e., point distance to the planes corresponding to the other beam measurements is minimized) and the measured points of each of the beams fall on the same plane. For example, as shown in FIG. 12 incorrect intrinsics when scanning a planar surface are calibrated such that all the beams measure the same plane. The optimization problem is performed jointly across all beams with constraints to ensure the estimated deviations per beam remain constrained. Joint optimization may be performed to ensure plane fitting remains consistent. For example, if beams are optimization one at a time, the problem could be unconstrained as a single beam does not usually provide enough constraints to fit a 3D plane.

For example, as shown in FIG. 12, incorrect intrinsics when scanning a planar surface are calibrated such that all the beams measure the same plane 1210. In such embodiments, the objective function may be defined as:

$$n_{i,k}^T[f(x_{i,k};k_i)-f(\overline{x}_{i+1};k_{i+1})]$$

At each iteration, for each beam i=1 corresponding to the neighboring beams i−1 and i+1, planar segmentation of the point cloud representing the calibration environment is performed to generate a plane with a surface normal $n_{i,k}$ and the closest point distances 1201 and 1202 are minimized by estimating the optimization parameters. For planar segmentation of the environment, it may be assumed that at a small scale (e.g., about 10×10 cm²) the world can is planar. Optionally, the optimization may be restricted to the most prominent planar area in the environment to improve the efficiency of the algorithm. Since the world is assumed to be composed of small planar structure, a ground truth planar target is not required.

In various embodiments, the initial intrinsics of the sensor (e.g., factory parameters) may be assumed to be close enough to the actual intrinsics in order to facilitate reliable planar segmentation of the world. As such, the optimization parameters may initially be estimated based on such initial intrinsics. One or more of the parameters may then be changed (increased or decreased) by some increment, and the objective function may be recalculated. The parameters may then be changed again in whichever direction, the objective function is improved, or else the parameters are held constant if any perturbation is worse. In this manner, the system may iteratively loop through all parameters and/or beams, optimizing the objective function at each step, until either some predetermined number of iterations is reached or until the change in the global objective function becomes sufficiently small.

At 1008, the process may be iterated until changes in the estimated parameters are stabilized because planar reconstruction of the environment depends on the selection of per-beam parameters. Optionally, to improve convergence, a small penalty may be added on each of the terms of the objective function above to encourage the optimization problem to remain close to the initial solution as desired.

Calibration Validation:

As discussed above, there are numerous sources of noise or error that can impact the accuracy of the calibration, either initially or over time. Accordingly, it is desirable to also recognize potential calibration anomalies and undertake appropriate remedial action(s) to mitigate potential degradation of the calibration. For example, the extrinsic calibration values may drift over time due to shifts in the sensors' poses caused by jerky movements.

Similar to the calibration process, it is important to validate both the per sensor calibration (intrinsic and with respect to a global reference frame), as well as the relative calibration of all the sensors of a vehicle. If the validation of one or more of these calibrations is determined to be unsuccessful, certain actions may be taken (as discussed below).

Figure 13:
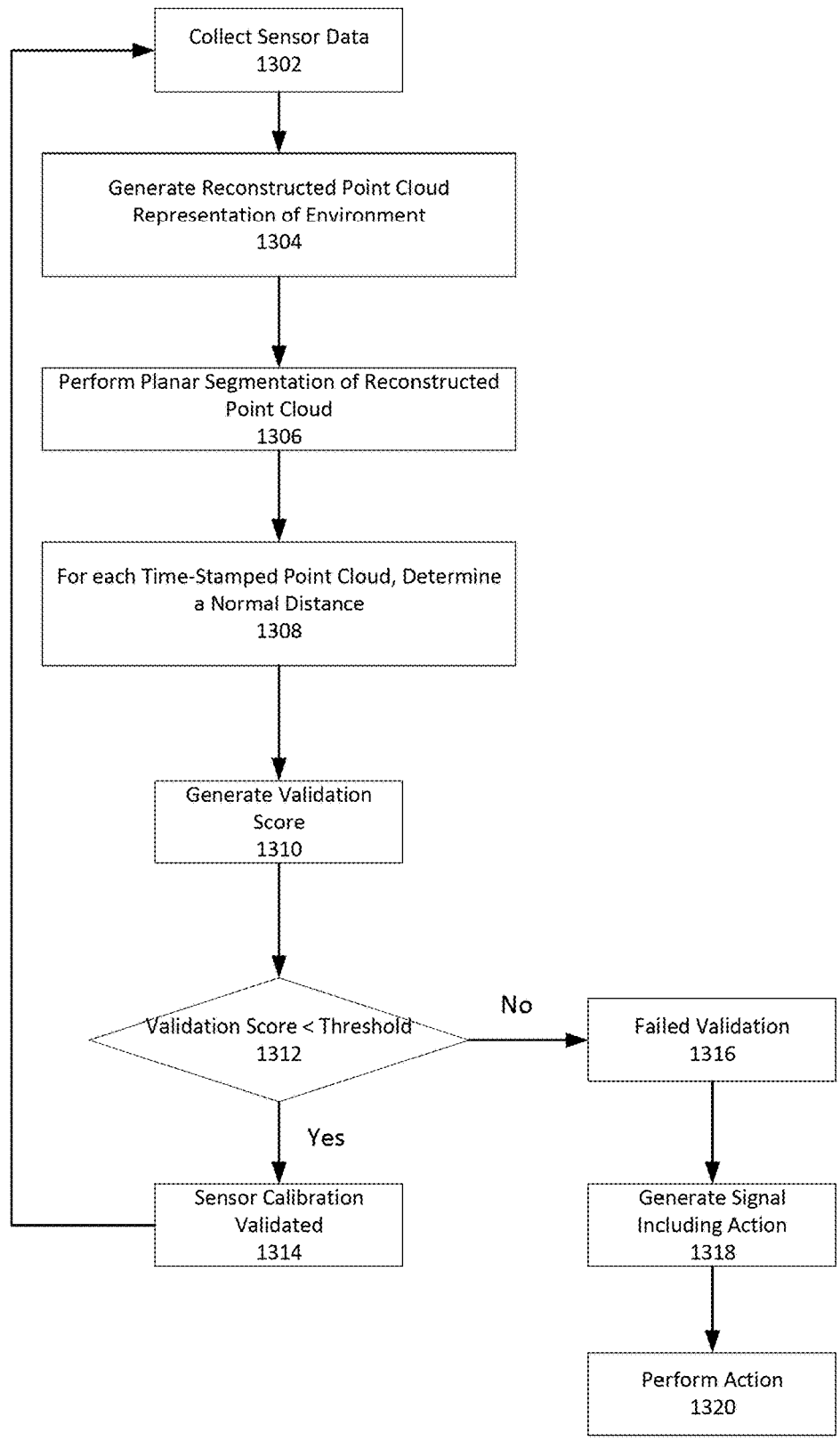
FIG. 13 illustrates various aspects of a method for performing validation of sensor calibration of a LiDAR mounted on a vehicle, according to various embodiments of the present disclosure.

Referring now to FIG. 13, a method for periodically or continually validating accuracy of an existing calibration of a single LiDAR sensor (intrinsic and with respect to a global reference frame) is illustratively depicted, in accordance with various embodiments of the present disclosure. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order.

The method may begin at 1302 where sensor data corresponding to an environment is collected by a LiDAR sensor. For example, if the calibration is being performed in the calibration environment of FIG. 2, the sensor data may be collected as the platform on which the vehicle including the LiDAR is rotated in a 360° rotation with LiDAR scans being collected at every 10° such that a total of 36 scans are collected. The scans may be processed using any hereafter or after known point cloud reconstruction methods to generate a representation of the calibration environment as a reconstructed point cloud (1304).

Figure 14:
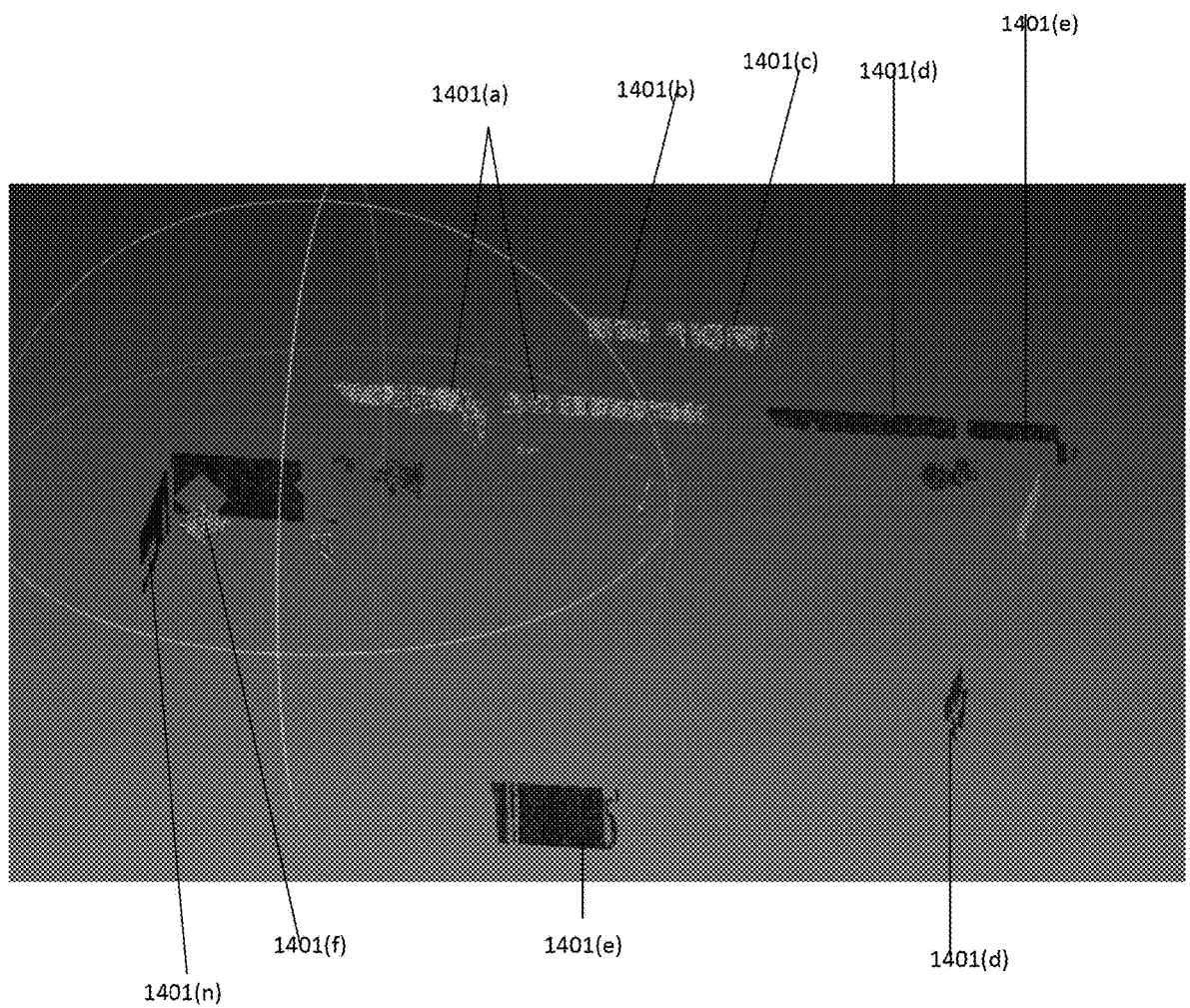
FIG. 14 illustrates plane segmentation of a reconstructed point cloud for performing validation.

The method continues at 1306 to perform planar segmentation by segmenting the reconstructed point cloud into planar clusters and fit planes to the planar clusters. The segmentation and fitting may be performed using, for example, point component analysis (PCA) or any now or hereafter known planar segmentation methods. FIG. 14 illustrates an example segmentation of a reconstructed point cloud including planes 1401(a)-(n), where similar hatching patterns illustrate the same plane (any locally available planar structure in the calibration environment having a size in the order of 10×10 cm²).

At 1308, for point clouds corresponding to each of the LiDAR beams, corresponding points may be identified in one or more of the segmented planes. An average normal distance (i.e., point-to-plane) distance may then be determined between each of the LiDAR beams and a best fit plane corresponding to that set of beams. Specifically, intrinsic calibration may be performed per beam.

A validation score is generated (1310) as an average of the normal distances of LiDAR beams, and compared to a threshold (1312). If the validation score is larger than the threshold, the sensor is determined to have failed calibration validation (1316). However, if the validation score is smaller than the threshold, the sensor calibration is determined to be validated (1314). When the calibration remains valid, use of the existing transformation parameters to assign attributes to device data sets and autonomously operate actuators onboard the vehicle continues. However, when the difference indicates that the calibration may be invalid, one or more remedial actions are undertaken to resolve any discrepancies or anomalies, such as, for example, recalibrating the device.

According to various embodiments, the threshold may be a predetermined value that is stored in a memory such as a database. Alternatively, or in addition, the threshold may be updated and/or may be dynamic in nature.

If the sensor is calibrated, steps 1302-1312 may be repeated, for example, periodically, upon occurrence of certain events (e.g., a detection of a jolt, rain, etc.), and/or upon receipt of user instructions. If the sensor is not calibrated, the system may generate a signal that will result in an action (1318). The signal may be a communication to a user interface in the AV and/or an external server with a message indicating that that the sensor is not calibrated. The system also may generate an alternative message when the system determines that the sensor is calibrated. In addition, the system may identify an action for the AV to perform and causes the AV to perform the action (1320). The action may include recalibrating the sensor, altering a trajectory of the AV, altering a velocity of the AV, and/or any other suitable action in response to the action assessment. Optionally, the action may be performed only if an action assessment score is above a threshold, the action assessment score correlated to a perceived likelihood that an event is to occur. According to various embodiments, the threshold for the action assessment score may be a predetermined that is stored in a memory such as a database. Alternatively, or in addition, the threshold may be updated and/or may be dynamic in nature.

In various embodiments, the above disclosed systems and methods may be to recalibrate the sensor. Optionally, users can be instructed to recalibrate the sensor using a notification or alert (for example, using a vehicle interface such as an interactive display or audio system). The notifications or alerts can be issued periodically or at certain triggers, for example, based on a defined amount of time that has passed or a defined number of miles driven since the last calibration. Optionally, the system may adjust the LiDAR calibration accordingly to bring the LiDAR into calibration.

Optionally, if the sensor is determined to be calibrated in 1314, extrinsic calibration validation may be performed for determining calibration accuracy of all the LiDAR sensors of the vehicle.

Figure 15:
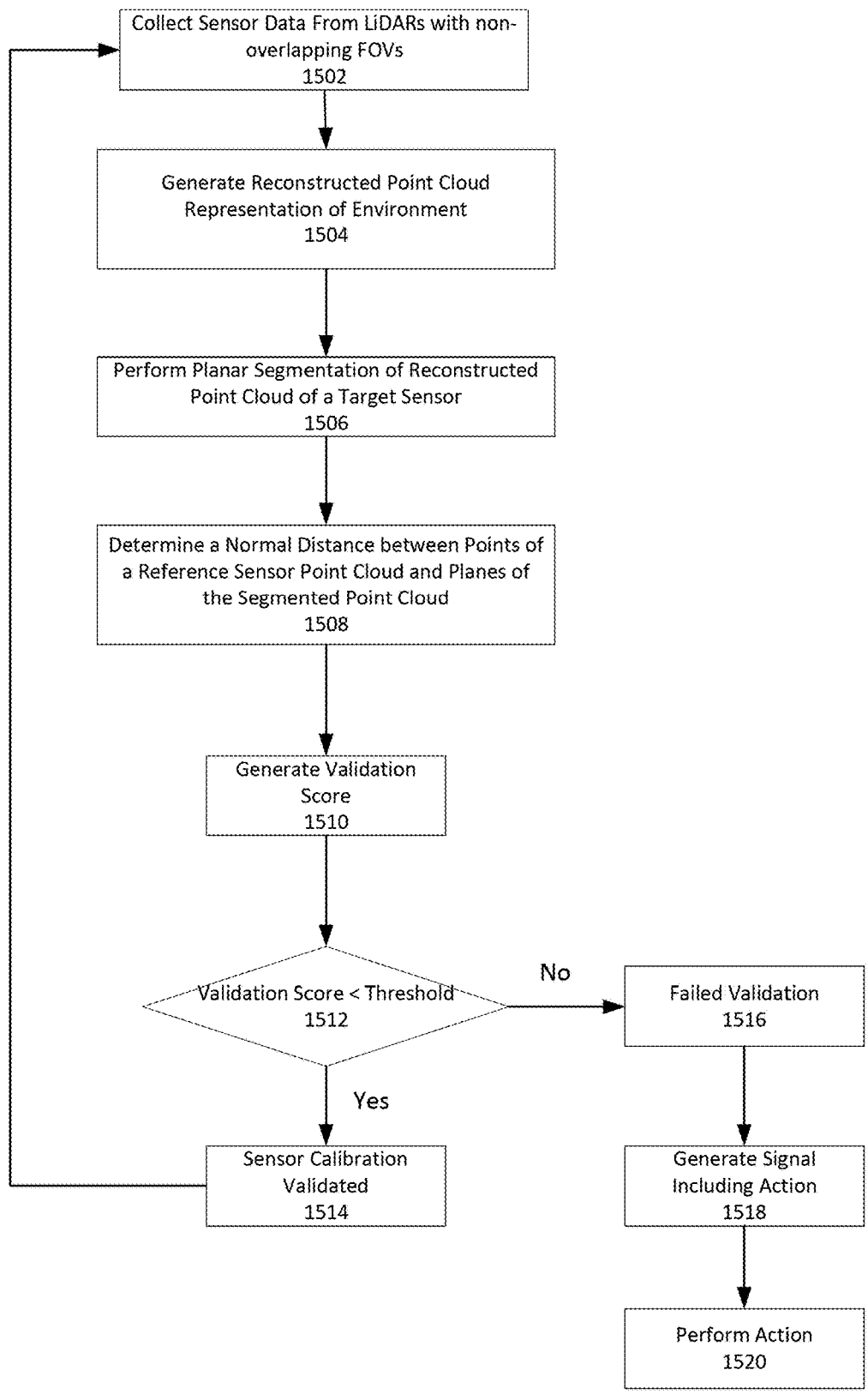
FIG. 15 illustrates various aspects of a method for performing validation of sensor calibration of multiple LiDAR sensors with non-overlapping FOVs mounted on a vehicle, according to various embodiments of the present disclosure.

Referring now to FIG. 15, a method for periodically or continually validating accuracy of an existing extrinsic calibration of non-overlapping LiDAR sensors of a vehicle is illustratively depicted, in accordance with various embodiments of the present disclosure. Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order.

The method may begin at 1502 where sensor data corresponding to an environment is collected by the non-overlapping LiDAR sensors. For example, if the calibration is being performed in the calibration environment of FIG. 2, the sensor data may be collected as the platform on which the vehicle including the LiDARs is rotated 360°. The scans collected by each LiDAR may be processed using any hereafter or after known point cloud reconstruction methods to generate corresponding representations of the calibration environment as a reconstructed point cloud (1504).

The method continues at 1506 to segment the reconstructed point cloud of a target sensor into planar clusters and fit planes to the planar clusters. The segmentation and fitting may be performed using, for example, point component analysis (PCA).

At 1508, from the reconstructed point cloud of a reference sensor, corresponding points may be identified in one or more of the segmented planes and normal distances (i.e., point-to-plane distances) may be determined between each matched point and the corresponding plane(s).

A validation score is generated (1510) as an average of the normal distances and compared to a threshold (1512). If the validation score is larger than the threshold, the extrinsic calibration between the target and reference sensor is determined to have failed calibration validation (1516). However, if the validation score is smaller than the threshold, the extrinsic calibration between the target and reference sensor is determined to be validated (1514). When the extrinsic calibration between the target and reference sensor remains valid, use of the existing transformation parameters to assign attributes to device data sets and autonomously operate actuators onboard the vehicle continues. However, when the difference indicates that the calibration may be invalid, one or more remedial actions are undertaken to resolve any discrepancies or anomalies, such as, for example, recalibrating the device.

According to various embodiments, the threshold may be a predetermined value that is stored in a memory such as a database. Alternatively, or in addition, the threshold may be updated and/or may be dynamic in nature.

If the extrinsic calibration is validated, steps 1502-1512 may be repeated, for example, periodically, upon occurrence of certain events (e.g., a detection of a jolt, rain, etc.), and/or upon receipt of user instructions. If the extrinsic calibration is not validated, the system may generate a signal that will result in an action (1518). The signal may be a communication to a user interface in the AV and/or an external server with a message indicating that that the extrinsic calibration is not validated. The system also may generate an alternative message when the system determines that the extrinsic calibration is validated. In addition, the system may identify an action for the AV to perform and causes the AV to perform the action (1520). The action may include reperforming the extrinsic calibration, altering a trajectory of the AV, altering a velocity of the AV, and/or any other suitable action in response to the action assessment. Optionally, the action may be performed only if an action assessment score is above a threshold, the action assessment score correlated to a perceived likelihood that an event is to occur. According to various embodiments, the threshold for the action assessment score may be a predetermined that is stored in a memory such as a database. Alternatively, or in addition, the threshold may be updated and/or may be dynamic in nature.

In various embodiments, the above disclosed systems and methods may be to perform the extrinsic calibration. Optionally, users can be instructed to perform the extrinsic calibration the sensor using a notification or alert (for example, using a vehicle interface such as an interactive display or audio system). The notifications or alerts can be issued periodically or at certain triggers, for example, based on a defined amount of time that has passed or a defined number of miles driven since the last calibration. Optionally, the system may adjust the LiDAR calibration accordingly to bring the LiDAR into calibration.

Figure 16:
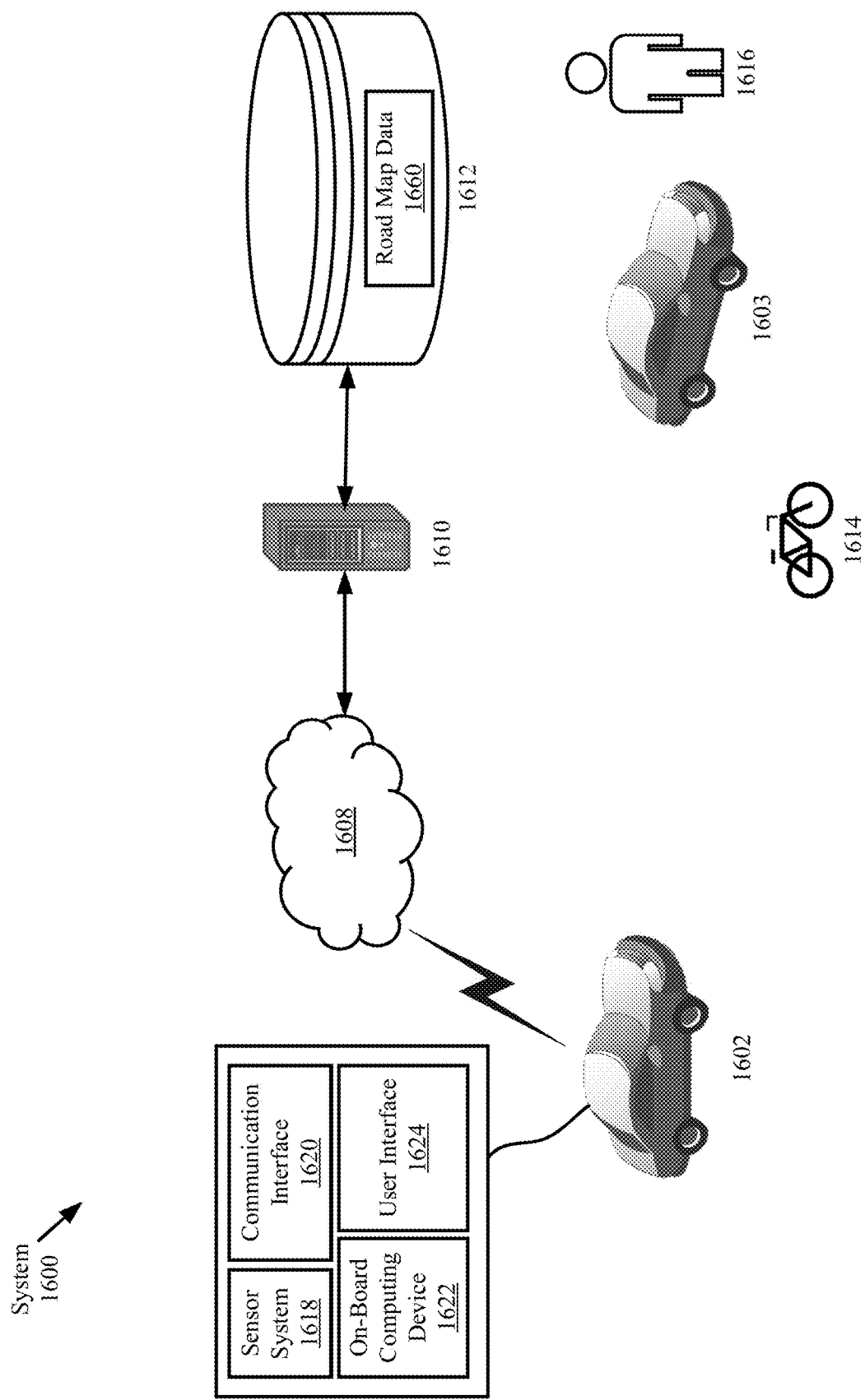
FIG. 16 illustrates a system in accordance with aspects of the disclosure.

FIG. 16 illustrates an example system 1600, in accordance with aspects of the disclosure. System 1600 comprises a vehicle 1602 that is traveling along a road in a semi-autonomous or autonomous manner. Vehicle 1602 is also referred to in this document as AV 1602. AV 1602 can include, but is not limited to, a land vehicle (as shown in FIG. 16), an aircraft, or a watercraft. As noted above, except where specifically noted this disclosure is not necessarily limited to AV embodiments, and it may include non-autonomous vehicles in some embodiments.

AV 1602 is generally configured to detect objects in its proximity. The objects can include, but are not limited to, a vehicle 1603, cyclist 1614 (such as a rider of a bicycle, electric scooter, motorcycle, or the like) and/or a pedestrian 1616.

As illustrated in FIG. 16, the AV 1602 may include a sensor system 1618, an on-board computing device 1622, a communications interface 1620, and a user interface 1624. Autonomous vehicle system may further include certain components (as illustrated, for example, in FIG. 17) included in vehicles, which may be controlled by the on-board computing device 1622 using a variety of communication signals and/or commands, such as, for example, acceleration signals or commands, deceleration signals or commands, steering signals or commands, braking signals or commands, etc.

The sensor system 1618 may include one or more sensors that are coupled to and/or are included within the AV 1602. For example, such sensors may include, without limitation, a LiDAR system, a RADAR system, a laser detection and ranging (LADAR) system, a sound navigation and ranging (SONAR) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 1602, information about the environment itself, information about the motion of the AV 1602, information about a route of the vehicle, or the like. As AV 1602 travels over a surface, at least some of the sensors may collect data pertaining to the surface.

The AV 1602 may also communicate sensor data collected by the sensor system to a remote computing device 1610 (for example, a cloud processing system) over communications network 108. Remote computing device 1610 may be configured with one or more servers to perform one or more processes of the technology described in this document. Remote computing device 1610 may also be configured to communicate data/instructions to/from AV 1602 over network 1608, to/from server(s) and/or datastore(s) 1612. Datastore(s) 1612 may include, but are not limited to, database(s).

Network 1608 may include one or more wired or wireless networks. For example, the network 1608 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 1602 may retrieve, receive, display, and edit information generated from a local application or delivered via network 108 from datastore 1612. Datastore 1612 may be configured to store and supply raw data, indexed data, structured data, road map data 160, program instructions or other configurations as is known.

The communications interface 1620 may be configured to allow communication between AV 1602 and external systems, such as, for example, external devices, sensors, other vehicles, servers, data stores, databases, etc. The communications interface 1620 may utilize any now or hereafter known protocols, protection schemes, encodings, formats, packaging, etc. such as, without limitation, Wi-Fi, an infrared link, Bluetooth, etc. The user interface system 1624 may be part of peripheral devices implemented within the AV 1602 including, for example, a keyboard, a touch screen display device, a microphone, and a speaker, etc. The vehicle also may receive state information, descriptive information or other information about devices or objects in its environment via the communication interface 1620 over communication links such as those known as vehicle-to-vehicle, vehicle-to-object or other V2X communication links. The term "V2X" refers to a communication between a vehicle and any object that the vehicle may encounter or affect in its environment.

Figure 17:
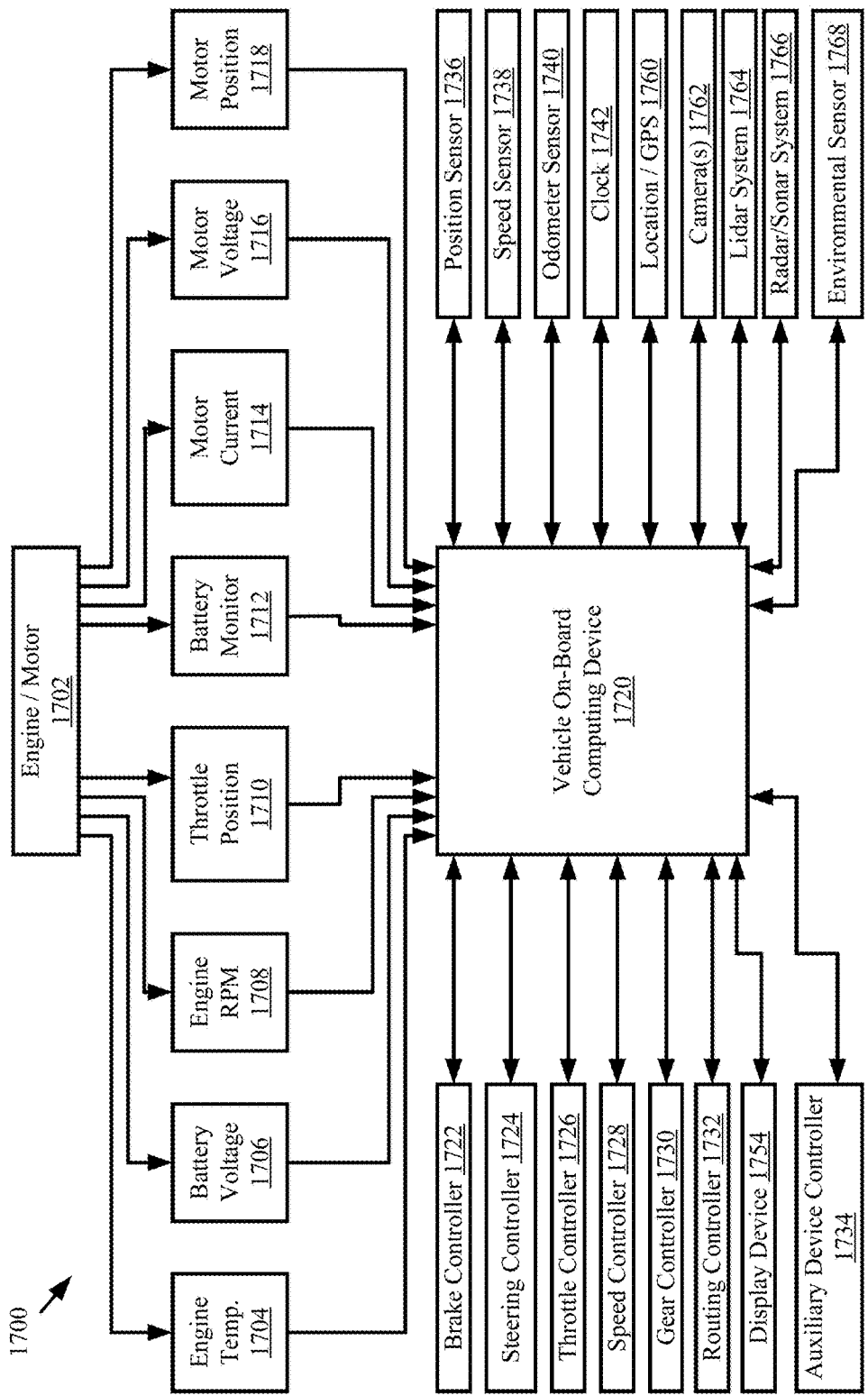
FIG. 17 illustrates an example architecture for a vehicle, in accordance with aspects of the disclosure.

FIG. 17 illustrates an example system architecture 1700 for a vehicle, in accordance with aspects of the disclosure. Vehicles 1602, 1603 of FIG. 16, and/or vehicle 205 of FIG. 2 can have the same or similar system architecture as that shown in FIG. 2. Thus, the following discussion of system architecture 1700 is sufficient for understanding vehicle(s) 1602, 1603 of FIG. 16 and/or vehicle 205 of FIG. 2. However, other types of vehicles are considered within the scope of the technology described in this document and may contain more or less elements as described in association with FIG. 17. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 17, system architecture 1700 for a vehicle includes an engine or motor 1702 and various sensors 1704-1718 for measuring various parameters of the vehicle. In gas-powered or hybrid vehicles having a fuel-powered engine, the sensors may include, for example, an engine temperature sensor 1704, a battery voltage sensor 1706, an engine revolutions per minute (RPM) sensor 1708, and a throttle position sensor 1710. If the vehicle is an electric or hybrid vehicle, then the vehicle may have an electric motor, and accordingly includes sensors such as a battery monitoring system 1712 (to measure current, voltage and/or temperature of the battery), motor current 1714 and voltage 1716 sensors, and motor position sensors 1718 such as resolvers and encoders.

Operational parameter sensors that are common to both types of vehicles include, for example: a position sensor 1736 such as an accelerometer, gyroscope and/or inertial measurement unit; a speed sensor 1738; and an odometer sensor 1740. The vehicle also may have a clock 1742 that the system uses to determine vehicle time during operation. The clock 1742 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 1760 (such as a Global Positioning System (GPS) device); object detection sensors such as one or more cameras 1762; a lidar system 1764; and/or a radar and/or a sonar system 1766. The sensors also may include environmental sensors 1768 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 1720. The vehicle on-board computing device 1720 may be implemented using the computer system of FIG. 18. The vehicle on-board computing device 1720 analyzes the data captured by the sensors and optionally controls operations of the vehicle based on results of the analysis. For example, the vehicle on-board computing device 1720 may control: braking via a brake controller 1722; direction via a steering controller 1724; speed and acceleration via a throttle controller 1726 (in a gas-powered vehicle) or a motor speed controller 1728 (such as a current level controller in an electric vehicle); a differential gear controller 1730 (in vehicles with transmissions); and/or other controllers. Auxiliary device controller 1734 may be configured to control one or more auxiliary devices, such as testing systems, auxiliary sensors, mobile devices transported by the vehicle, etc.

Geographic location information may be communicated from the location sensor 1760 to the vehicle on-board computing device 1720, which may then access a map of the environment that corresponds to the location information to determine known fixed features of the environment such as streets, buildings, stop signs and/or stop/go signals. Captured images from the cameras 1762 and/or object detection information captured from sensors such as lidar system 1764 is communicated from those sensors) to the vehicle on-board computing device 1720. The object detection information and/or captured images are processed by the vehicle on-board computing device 1720 to detect objects in proximity to the vehicle. Any known or to be known technique for making an object detection based on sensor data and/or captured images can be used in the embodiments disclosed in this document.

Lidar information is communicated from lidar system 1764 to the vehicle on-board computing device 1720. Additionally, captured images are communicated from the camera(s) 1762 to the vehicle on-board computing device 1720. The lidar information and/or captured images are processed by the vehicle on-board computing device 1720 to detect objects in proximity to the vehicle. The manner in which the object detections are made by the vehicle on-board computing device 1720 includes such capabilities detailed in this disclosure.

In addition, the system architecture 1700 may include an onboard display device 1754 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 1720 may include and/or may be in communication with a routing controller 1732 that generates a navigation route from a start position to a destination position for an autonomous vehicle. The routing controller 1732 may access a map data store to identify possible routes and road segments that a vehicle can travel on to get from the start position to the destination position. The routing controller 1732 may score the possible routes and identify a preferred route to reach the destination. For example, the routing controller 1732 may generate a navigation route that minimizes Euclidean distance traveled or other cost function during the route, and may further access the traffic information and/or estimates that can affect an amount of time it will take to travel on a particular route. Depending on implementation, the routing controller 1732 may generate one or more routes using various routing methods, such as Dijkstra's algorithm, Bellman-Ford algorithm, or other algorithms. The routing controller 1732 may also use the traffic information to generate a navigation route that reflects expected conditions of the route (for example, current day of the week or current time of day, etc.), such that a route generated for travel during rush-hour may differ from a route generated for travel late at night. The routing controller 1732 may also generate more than one navigation route to a destination and send more than one of these navigation routes to a user for selection by the user from among various possible routes.

In various embodiments, the vehicle on-board computing device 1720 may determine perception information of the surrounding environment of the AV. Based on the sensor data provided by one or more sensors and location information that is obtained, the vehicle on-board computing device 1720 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 1720 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 1720 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 1720 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 1720 may perform one or more prediction and/or forecasting operations. For example, the vehicle on-board computing device 1720 may predict future locations, trajectories, and/or actions of one or more objects. For example, the vehicle on-board computing device 1720 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 1720 may predict whether the object will likely move straight forward or make a turn. If the perception data indicates that the intersection has no traffic light, the vehicle on-board computing device 1720 may also predict whether the vehicle may have to fully stop prior to entering the intersection.

In various embodiments, the vehicle on-board computing device 1720 may determine a motion plan for the autonomous vehicle. For example, the vehicle on-board computing device 1720 may determine a motion plan for the autonomous vehicle based on the perception data and/or the prediction data. Specifically, given predictions about the future locations of proximate objects and other perception data, the vehicle on-board computing device 1720 can determine a motion plan for the AV that best navigates the autonomous vehicle relative to the objects at their future locations.

In some embodiments, the vehicle on-board computing device 1720 may receive predictions and make a decision regarding how to handle objects and/or actors in the environment of the AV. For example, for a particular actor (for example, a vehicle with a given speed, direction, turning angle, etc.), the vehicle on-board computing device 1720 decides whether to overtake, yield, stop, and/or pass based on, for example, traffic conditions, map data, state of the autonomous vehicle, etc. Furthermore, the vehicle on-board computing device 1720 also plans a path for the AV to travel on a given route, as well as driving parameters (for example, distance, speed, and/or turning angle). That is, for a given object, the vehicle on-board computing device 1720 decides what to do with the object and determines how to do it. For example, for a given object, the vehicle on-board computing device 1720 may decide to pass the object and may determine whether to pass on the left side or right side of the object (including motion parameters such as speed). The vehicle on-board computing device 1720 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 1720 may execute one or more control instructions to perform a cautious maneuver (for example, mildly slow down, accelerate, change lane, or swerve). In contrast, if the collision cannot be avoided, then the vehicle on-board computing device 1720 may execute one or more control instructions for execution of an emergency maneuver (for example, brake and/or change direction of travel).

As discussed above, planning and control data regarding the movement of the autonomous vehicle is generated for execution. The vehicle on-board computing device 1720 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 18:
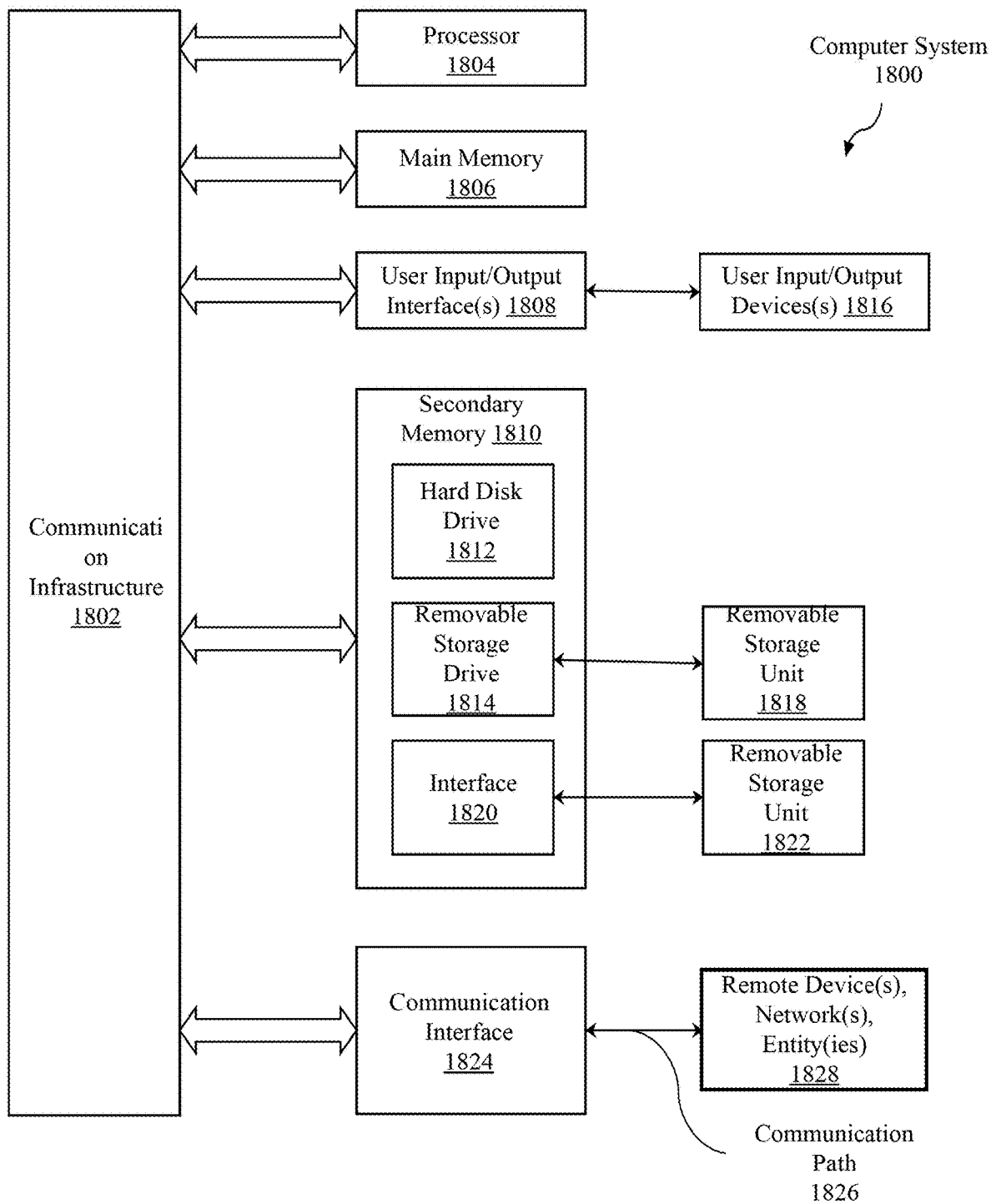
FIG. 18 illustrates a computer system useful for implementing various embodiments.

Various embodiments can be implemented, for example, using one or more computer systems, such as computer system 1800 shown in FIG. 18. Computer system 1800 can be any computer capable of performing the functions described in this document.

Computer system 1800 includes one or more processors (also called central processing units, or CPUs), such as a processor 1804. Processor 1804 is connected to a communication infrastructure or bus 1802. Optionally, one or more of the processors 1804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1800 also includes user input/output device(s) 1816, such as monitors, keyboards, pointing devices, etc., that communicate with communication infrastructure 1802 through user input/output interface(s) 1808.

Computer system 1800 also includes a main or primary memory 1806, such as random access memory (RAM). Main memory 1806 may include one or more levels of cache. Main memory 1806 has stored therein control logic (i.e., computer software) and/or data.

Computer system 1800 may also include one or more secondary storage devices or memory 1810. Secondary memory 1810 may include, for example, a hard disk drive 1812 and/or a removable storage device or drive 1814. Removable storage drive 1814 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1814 may interact with a removable storage unit 1818. Removable storage unit 1818 includes a computer usable or readable storage device having stored thereon computer software (control logic) and/or data. Removable storage unit 1818 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1814 reads from and/or writes to removable storage unit 1818 in a well-known manner.

According to an example embodiment, secondary memory 1810 may include other means, instrumentalities or other approaches for allowing computer programs and/or other instructions and/or data to be accessed by computer system 1800. Such means, instrumentalities or other approaches may include, for example, a removable storage unit 1822 and an interface 1820. Examples of the removable storage unit 1822 and the interface 1820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1800 may further include a communication or network interface 1824. Communication interface 1824 enables computer system 1800 to communicate and interact with any combination of remote devices, remote networks, remote entities, etc. (individually and collectively referenced by reference number 1828). For example, communication interface 1824 may allow computer system 1800 to communicate with remote devices 1828 over communications path 1826, which may be wired and/or wireless, and which may include any combination of LANs, WANs, the Internet, etc. Control logic and/or data may be transmitted to and from computer system 1800 via communication path 1826.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1800, main memory 1806, secondary memory 1810, and removable storage units 1818 and 1822, as well as tangible articles of manufacture embodying any combination of the foregoing. Such control logic, when executed by one or more data processing devices (such as computer system 1800), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 18. In particular, embodiments can operate with software, hardware, and/or operating system implementations other than those described in this document. The features from different embodiments disclosed herein may be freely combined. For example, one or more features from a method embodiment may be combined with any of the system or product embodiments. Similarly, features from a system or product embodiment may be combined with any of the method embodiments herein disclosed.

As described above, this document discloses methods and systems calibrating LiDAR sensors mounted on a vehicle and having non-overlapping fields of view (FOVs). The system embodiments include a first LiDAR sensor and a second LiDAR sensor mounted on a vehicle, as well as a processor. The computer program embodiments include programming instructions (e.g., stored in a memory), to cause a processor to perform the sensor calibration methods described in this document. The system embodiments also include a processor which is configured to perform the sensor calibration methods described in this document, e.g., via the programming instructions. More generally, the system embodiments include a system comprising means to perform the steps of the any of the methods described in this document.

In various embodiments, the methods include collecting first sensor data corresponding to a calibration environment from a first LiDAR sensor mounted on the vehicle, and second sensor data corresponding to the calibration environment from a second sensor LiDAR sensor mounted on the vehicle. The methods also include transforming the first sensor data to generate a first aligned frame in a global reference frame, and transforming the second sensor data to generate a second aligned frame in the global reference frame. The first reference frame is aligned with the second reference frame to extrinsically calibrate the first LiDAR sensor and the second LiDAR sensor. The first sen In some embodiments, collecting the first sensor data or the second sensor data may include rotating a rotating platform in the calibration environment to a plurality of angular positions when the vehicle is mounted on the rotating platform, and collecting at each of the plurality of angular positions, a sweep as a collection of LiDAR scans from each LiDAR sensor.

Optionally, in any of the embodiments described above, the methods may also include determining the plurality of angular positions based on an FOV of a LiDAR sensor such that two or more sweeps collected by the LiDAR sensor share an overlapping view of the calibration environment. Optionally, transforming the first sensor data to generate the first aligned frame or transforming the second sensor data to generate the second aligned frame includes performing inter-sweep alignment between a reference sweep and two or more of a plurality of other sweeps collected by that LiDAR sensor to generate a plurality of aligned subsets of sweeps.

Optionally, in any of the embodiments described above, the methods can further include globally aligning the plurality of aligned subsets of sweeps to generate an aligned frame. Globally aligning the plurality of aligned subsets of sweeps may include performing pose graph optimization to estimate a plurality of LiDAR sensor poses while collecting each of a plurality of sweeps.

Optionally, in any of the embodiments described above, the performing inter-sweep alignment may include using an iterative closest point technique to generate a transformation between the reference sweep and each of the two or more of the plurality of other sweeps.

Optionally, in any of the embodiments described above, the method may also include determining whether an inter-sweep alignment between the reference sweep and another sweep is successful based on, for example, an overlap percentage between the reference sweep and the another sweep and/or a final alignment error.

Optionally, in any of the embodiments described above, aligning the first reference frame with the second reference frame to extrinsically calibrate the first LiDAR sensor and the second LiDAR sensor can include using iterative closest point technique to generate a transformation between the first reference frame and the second reference frame. In any such embodiments, the methods can also include defining an initial transformation based on a model of the calibration environment, and iteratively refining the initial transformation to generate the transformation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

As described above, this document discloses system, method, and computer program product embodiments for operating a vehicle. The system embodiments include a processor or computing device implementing the methods for operating a vehicle. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of the any of the methods described in this document.

Without excluding further possible embodiments, certain example embodiments are summarized in the following clauses.

Clause 1: A method for calibration of LiDAR sensors mounted on a vehicle, the method comprising:
collecting, from a first LiDAR sensor mounted on the vehicle, first sensor data corresponding to a calibration environment;
collecting, from a second sensor LiDAR sensor mounted on the vehicle, second sensor data corresponding to the calibration environment, wherein a first field of view (FOV) of the first LiDAR sensor does not overlap with a second FOV of the second LiDAR sensor;
transforming the first sensor data to generate a first aligned frame in a global reference frame;
transforming the second sensor data to generate a second aligned frame in the global reference frame; and
aligning the first reference frame with the second reference frame to extrinsically calibrate the first LiDAR sensor and the second LiDAR sensor.

Clause 2. The method of clause 1, wherein collecting the first sensor data or the second sensor data comprises:
rotating a rotating platform in the calibration environment to a plurality of angular positions, the vehicle being mounted on the rotating platform; and
collecting, using that LiDAR sensor, at each of the plurality of angular positions, a sweep as a collection of LiDAR scans.

Clause 3. The method of any of the above clauses, further comprising determining the plurality of angular positions based on an FOV of a LiDAR sensor such that two or more sweeps collected by the LiDAR sensor share an overlapping view of the calibration environment.

Clause 4. The method of any of the above clauses, wherein transforming the first sensor data to generate the first aligned frame or transforming the second sensor data to generate the second aligned frame comprises performing inter-sweep alignment between a reference sweep and two or more of a plurality of other sweeps collected by that LiDAR sensor to generate a plurality of aligned subsets of sweeps.

Clause 5. The method of clause 4, further comprising globally aligning the plurality of aligned subsets of sweeps to generate an aligned frame.

Clause 6. The method of clause 5, wherein globally aligning the plurality of aligned subsets of sweeps comprises performing pose graph optimization to estimate a plurality of LiDAR sensor poses while collecting each of a plurality of sweeps.

Clause 7. The method of any of the above clauses, wherein performing inter-sweep alignment comprises using an iterative closest point technique to generate a transformation between the reference sweep and each of the two or more of the plurality of other sweeps.

Clause 8. The method of any of the above clauses, further comprising determining whether an inter-sweep alignment between the reference sweep and another sweep is successful based on at least one of the following: an overlap percentage between the reference sweep and the another sweep or a final alignment error.

Clause 9. The method of any of the above clauses, wherein aligning the first reference frame with the second reference frame to extrinsically calibrate the first LiDAR sensor and the second LiDAR sensor comprises using iterative closest point technique to generate a transformation between the first reference frame and the second reference frame.

Clause 10. The method of clause 9, further comprising:
defining an initial transformation based on a model of the calibration environment; and
iteratively refining the initial transformation to generate the transformation.

Clause 11. A system comprising means for performing steps of any of the above method clauses.

Clause 12. A computer program, or a storage medium storing the computer program, comprising instructions, which when executed by one or more suitable processors cause any of the processors to perform the steps of any of the above method clauses.

Clause 13. A system for calibration of LiDAR sensors, the system comprising:
a vehicle comprising a first LiDAR sensor and a second LiDAR sensor;
a processor; and
a non-transitory computer readable medium comprising programming instructions that when executed by the processor, will cause the processor to:
collect, from the first LiDAR sensor, first sensor data corresponding to a calibration environment;
collect, from the second sensor LiDAR sensor, second sensor data corresponding to the calibration environment, wherein a first field of view (FOV) of the first LiDAR sensor does not overlap with a second FOV of the second LiDAR sensor;
transform the first sensor data to generate a first aligned frame in a global reference frame;
transform the second sensor data to generate a second aligned frame in the global reference frame; and
align the first reference frame with the second reference frame to extrinsically calibrate the first LiDAR sensor and the second LiDAR sensor.

Clause 14. The system of clause 13, wherein the programming instructions that when executed by the processor, will cause the processor to collect the first sensor data or the second sensor data comprise programming instructions to cause the processor to:

rotate a rotating platform in the calibration environment to a plurality of angular positions, the vehicle being mounted on the rotating platform; and collect, using that LiDAR sensor, at each of the plurality of angular positions, a sweep as a collection of LiDAR scans.

Clause 15. The system of any of the above system clauses, further comprising programming instructions that when executed by the processor, will cause the processor to determine the plurality of angular positions based on an FOV of a LiDAR sensor such that two or more sweeps collected by the LiDAR sensor share an overlapping view of the calibration environment.

Clause 16. The system of any of the above system clauses, wherein the programming instructions that when executed by the processor, will cause the processor to transform the first sensor data to generate the first aligned frame or transform the second sensor data to generate the second aligned frame comprise programming instructions to cause the processor to perform inter-sweep alignment between a reference sweep and two or more of a plurality of other sweeps collected by that LiDAR sensor to generate a plurality of aligned subsets of sweeps.

Clause 17. The system of clause 16, further comprising programming instructions that when executed by the processor, will cause the processor to globally align the plurality of aligned subsets of sweeps to generate an aligned frame.

Clause 18. The system of clause 17, wherein the programming instructions that when executed by the processor, will cause the processor to globally align the plurality of aligned subsets of sweeps comprise programming instructions to cause the processor to perform pose graph optimization to estimate a plurality of LiDAR sensor poses while collecting each of a plurality of sweeps.

Clause 19. The system of any of the above system clauses, wherein programming instructions that when executed by the processor, will cause the processor to perform inter-sweep alignment comprise programming instructions to cause the processor to use an iterative closest point technique to generate a transformation between the reference sweep and each of the two or more of the plurality of other sweeps.

Clause 20. The system of any of the above system clauses, further comprising programming instructions that when executed by the processor, will cause the processor to determine whether an inter-sweep alignment between the reference sweep and another sweep is successful based on at least one of the following: an overlap percentage between the reference sweep and the another sweep or a final alignment error.

Clause 21. The system of any of the above system clauses, wherein the programming instructions that when executed by the processor, will cause the processor to align the first reference frame with the second reference frame to extrinsically calibrate the first LiDAR sensor and the second LiDAR sensor comprise programming instructions to cause the processor to use iterative closest point technique to generate a transformation between the first reference frame and the second reference frame.

Clause 22. A computer program product comprising a non-transitory computer-readable medium that stores instructions that, when executed by a computing device, will cause the computing device to perform operations comprising:

collecting, from a first LiDAR sensor mounted on a vehicle, first sensor data corresponding to a calibration environment;

collecting, from a second sensor LiDAR sensor mounted on the vehicle, second sensor data corresponding to the calibration environment, wherein a first field of view (FOV) of the first LiDAR sensor does not overlap with a second FOV of the second LiDAR sensor;

transforming the first sensor data to generate a first aligned frame in a global reference frame;

transforming the second sensor data to generate a second aligned frame in the global reference frame; and aligning the first reference frame with the second reference frame to extrinsically calibrate the first LiDAR sensor and the second LiDAR sensor.

What is claimed is:

1. A method for calibration of LiDAR sensors mounted on a vehicle, the method comprising:

collecting, from a first LiDAR sensor mounted on the vehicle, first sensor data corresponding to a calibration environment;

collecting, from a second sensor LiDAR sensor mounted on the vehicle, second sensor data corresponding to the calibration environment, wherein a first field of view (FOV) of the first LiDAR sensor does not overlap with a second FOV of the second LiDAR sensor;

transforming the first sensor data to generate a first aligned frame in a global reference frame;

transforming the second sensor data to generate a second aligned frame in the global reference frame; and aligning the first reference frame with the second reference frame to extrinsically calibrate the first LiDAR sensor and the second LiDAR sensor, wherein:

collecting the first sensor data or the second sensor data comprises:
rotating a rotating platform in the calibration environment to a plurality of angular positions, the vehicle being mounted on the rotating platform, and
collecting, using that LiDAR sensor, at each of the plurality of angular positions, a sweep as a collection of LiDAR scans; and transforming the first sensor data to generate the first aligned frame or transforming the second sensor data to generate the second aligned frame comprises performing inter-sweep alignment between a reference sweep and two or more of a plurality of other sweeps collected by that LiDAR sensor to generate a plurality of aligned subsets of sweeps.

2. The method of claim 1, further comprising determining the plurality of angular positions based on an FOV of a LiDAR sensor such that two or more sweeps collected by the LiDAR sensor share an overlapping view of the calibration environment.

3. The method of claim 1, further comprising globally aligning the plurality of aligned subsets of sweeps to generate an aligned frame.

4. The method of claim 3, wherein globally aligning the plurality of aligned subsets of sweeps comprises performing pose graph optimization to estimate a plurality of LiDAR sensor poses while collecting each of a plurality of sweeps.

5. The method of claim 1, wherein performing inter-sweep alignment comprises using an iterative closest point technique to generate a transformation between the reference sweep and each of the two or more of the plurality of other sweeps.

6. The method of claim 1, further comprising determining whether an inter-sweep alignment between the reference sweep and another sweep is successful based on at least one of the following:
an overlap percentage between the reference sweep and the another sweep or a final alignment error.

7. The method of claim 1, wherein aligning the first reference frame with the second reference frame to extrinsically calibrate the first LiDAR sensor and the second LiDAR sensor comprises using iterative closest point technique to generate a transformation between the first reference frame and the second reference frame.

8. The method of claim 7, further comprising:
defining an initial transformation based on a model of the calibration environment; and
iteratively refining the initial transformation to generate the transformation.

9. A system for calibration of LiDAR sensors, the system comprising:
a vehicle comprising a first LiDAR sensor and a second LiDAR sensor;
a processor; and
programming instructions stored in a memory and configured to cause the processor to:
collect, from the first LiDAR sensor, first sensor data corresponding to a calibration environment;
collect, from the second sensor LiDAR sensor, second sensor data corresponding to the calibration environment, wherein a first field of view (FOV) of the first LiDAR sensor does not overlap with a second FOV of the second LiDAR sensor;
transform the first sensor data to generate a first aligned frame in a global reference frame;
transform the second sensor data to generate a second aligned frame in the global reference frame; and
align the first reference frame with the second reference frame to extrinsically calibrate the first LiDAR sensor and the second LiDAR sensor by using iterative closest point technique to generate a transformation between the first reference frame and the second reference frame.

10. The system of claim 9, wherein the instructions to collect the first sensor data or the second sensor data comprise instructions to:
rotate a rotating platform in the calibration environment to a plurality of angular positions, the vehicle being mounted on the rotating platform; and
collect, using that LiDAR sensor, at each of the plurality of angular positions, a sweep as a collection of LiDAR scans.

11. The system of claim 10, further comprising additional programming instructions that are configured to cause the processor to determine the plurality of angular positions based on an FOV of a LiDAR sensor such that two or more sweeps collected by the LiDAR sensor share an overlapping view of the calibration environment.

12. The system of claim 10, wherein the instructions to transform the first sensor data to generate the first aligned frame or transform the second sensor data to generate the second aligned frame comprise instructions to perform inter-sweep alignment between a reference sweep and two or more of a plurality of other sweeps collected by that LiDAR sensor to generate a plurality of aligned subsets of sweeps.

13. The system of claim 12, further comprising additional programming instructions that are configured to cause the processor to globally align the plurality of aligned subsets of sweeps to generate an aligned frame.

14. The system of claim 13, wherein the instructions to globally align the plurality of aligned subsets of sweeps comprise instructions to perform pose graph optimization to estimate a plurality of LiDAR sensor poses while collecting each of a plurality of sweeps.

15. The system of claim 12, wherein the instructions to perform inter-sweep alignment comprise instructions to use an iterative closest point technique to generate a transformation between the reference sweep and each of the two or more of the plurality of other sweeps.

16. The system of claim 12, further comprising additional programming instructions that are configured to cause the processor to determine whether an inter-sweep alignment between the reference sweep and another sweep is successful based on at least one of the following: an overlap percentage between the reference sweep and the another sweep or a final alignment error.

17. The system of claim 9, further comprising additional programming instructions that are configured to cause the processor to:
define an initial transformation based on a model of the calibration environment; and
iteratively refine the initial transformation to generate the transformation.

18. A computer program product comprising a non-transitory computer-readable medium that stores instructions that, when executed by a computing device, will cause the computing device to perform operations comprising:
collecting, from a first LiDAR sensor mounted on a vehicle, first sensor data corresponding to a calibration environment;
collecting, from a second sensor LiDAR sensor mounted on the vehicle, second sensor data corresponding to the calibration environment, wherein a first field of view (FOV) of the first LiDAR sensor does not overlap with a second FOV of the second LiDAR sensor;
transforming the first sensor data to generate a first aligned frame in a global reference frame;
transforming the second sensor data to generate a second aligned frame in the global reference frame; and
aligning the first reference frame with the second reference frame to extrinsically calibrate the first LiDAR sensor and the second LiDAR sensor, aligning the first reference frame with the second reference frame using iterative closest point technique to generate a transformation between the first reference frame and the second reference frame.

19. The computer program product of claim 18, wherein the instructions that, when executed by a computing device, will further cause the computing device to perform operations comprising:
defining an initial transformation based on a model of the calibration environment; and
iteratively refining the initial transformation to generate the transformation.

\* \* \* \* \*